US006624402B2

(12) United States Patent
Kaneko et al.

(10) Patent No.: US 6,624,402 B2
(45) Date of Patent: Sep. 23, 2003

(54) SURVEYING INSTRUMENT, SURVEYING INSTRUMENT HAVING AF FUNCTION, SURVEYING INSTRUMENT HAVING PF MECHANISM, AND SURVEYING INSTRUMENT HAVING MULTIPLE-FOCUS FUNCTION

(75) Inventors: Kenji Kaneko, Tokyo (JP); Tadahisa Hoshino, Tokyo (JP); Shinichi Suzuki, Saitama (JP); Homu Takayama, Saitama (JP); Takanori Yachi, Tokyo (JP); Masayuki Ueno, Saitama (JP); Masahiro Sakurai, Saitama (JP); Go Watanabe, Tokyo (JP)

(73) Assignee: Pentax Precision Co., Ltd., Tokyo (JP)

( * ) Notice: Subject to any disclaimer, the term of this patent is extended or adjusted under 35 U.S.C. 154(b) by 77 days.

(21) Appl. No.: 09/852,022

(22) Filed: May 10, 2001

(65) Prior Publication Data

US 2001/0039740 A1 Nov. 15, 2001

(30) Foreign Application Priority Data

May 12, 2000 (JP) .................................... 2000-139516
May 12, 2000 (JP) .................................... 2000-140650
May 12, 2000 (JP) .................................... 2000-140651

(51) Int. Cl.[7] ............................................ G02B 27/40
(52) U.S. Cl. ................................ 250/201.2; 356/4.05
(58) Field of Search ........................ 250/201.2, 201.1, 250/206.1, 201.4, 201.5, 201.7; 340/870.01; 359/109, 368; 356/399, 625, 364, 5.01, 11, 4.04, 4.05; 396/89, 106, 79, 80, 94, 111, 121, 90

(56) References Cited

U.S. PATENT DOCUMENTS 4,130,340 A * 12/1978 Kooi .......................... 359/425
4,816,860 A * 3/1989 Iida et al. ..................... 396/80
5,003,400 A * 3/1991 Murakami et al. .......... 348/347
5,578,812 A * 11/1996 Kusaka .................... 250/201.2
5,711,080 A * 1/1998 Yamada ....................... 33/292
5,844,231 A * 12/1998 Suzuki et al. ............ 250/201.2
5,872,661 A 2/1999 Suzuki et al. ............... 359/698
5,923,426 A 7/1999 Perchak ...................... 356/353
6,266,911 B1 7/2001 Suzuki ........................ 42/119

* cited by examiner

*Primary Examiner*—David Porta
*Assistant Examiner*—Patrick J. Lee
(74) *Attorney, Agent, or Firm*—Greenblum & Bernstein, P.L.C.

(57) ABSTRACT

A surveying instrument having an AF apparatus, provided with a focusing lens and a collimation telescope, includes a focus detector for detecting a focus state through the collimation telescope, and a controller for moving the focusing lens of the collimation telescope to a focal position, based on the focus state detected by the focus detector. The surveying instrument includes a single focus mode at which only one detection of the output of the focus detector and only one control operation of the controller based on the detected output are carried out, and a continuous focus mode at which a plurality of detections of the output of the focus detector and a plurality of control operations of the controller based on the detected outputs are sequentially carried out, the single focus mode and the continuous mode being selectively performed.

26 Claims, 17 Drawing Sheets

AF Unit
Distance Indicator
Control Circuit
AF Start Switch
Measurement Start Switch
Focus Buzzer
Actuator
Lens Driving Device
Timer
Default Distance Setting Device

SURVEYING INSTRUMENT, SURVEYING INSTRUMENT HAVING AF FUNCTION, SURVEYING INSTRUMENT HAVING PF MECHANISM, AND SURVEYING INSTRUMENT HAVING MULTIPLE-FOCUS FUNCTION

BACKGROUND OF THE INVENTION

1. Field of the Invention

The present invention relates to a surveying instrument, a surveying instrument having a collimation telescope with a focusing apparatus, a surveying instrument having a power focus mechanism, and a surveying instrument having a multiple-focus apparatus.

2. Description of the Related Art

In a conventional surveying instrument, such as a total station, a focusing lens of a collimation telescope is manually moved to control the focus. In recent years, attempts have been made to provide an AF (automatic focusing) apparatus on the collimation telescope.

The surveying instrument having an AF apparatus basically includes a focus detector for detecting the focus through the collimation telescope, and a controller for controlling the movement of the focusing lens of the collimation telescope to a focal point in accordance with the focus state detected by the focus detector. If an AF switch is turned ON while viewing an object to be measured through the collimation telescope, the focusing lens is moved to the focal point of the sighting object. There is no problem with the focusing operation when the relative position of the collimation telescope and the sighting object is fixed.

In a pile driving operation, when the position of the sighting object, such as a target member, is moved to a specific distance position (e.g., 5 m, 10 m, etc.), the position is detected, i.e., the measurements are carried out, while the sighting object is being moved. However, to carry out the focusing operation upon the measurement, it is necessary for an operator to frequently and repeatedly turn the AF switch ON, so that the operation efficiency is very low.

In addition, at a measurement site, an operator may want to move the focusing lens without using the AF mechanism, for example when the AF function does not work well due to, for example, noise when the focusing lens must be moved at high speed or when a fine focus adjustment is carried out. Even in such a case, however, in a conventional surveying instrument, the operator can only move the focusing lens by manually rotating a manual adjustment ring in an MF (manual focusing) operation or by operating the AF mechanism.

SUMMARY OF THE INVENTION

It is an object of the present invention to eliminate the above-mentioned drawbacks of the surveying instrument having an AF function in the prior art by providing a surveying instrument, a surveying instrument having an AF function, a surveying instrument having a PF function, and a surveying instrument having a multiple-focus function, in which the focusing operation can be carried out in various fashions, for example, the AF operation can be easily carried out not only for the measurement of an object which is not moved, but also for the measurement of an object which is moved in a pile driving operation, or alternatively, the focusing operation can be carried out by being driven electrically.

In order to achieve the above-mention object, a surveying instrument having an AF apparatus is provided, which has a focusing lens and a collimation telescope. The surveying instrument includes a focus detector for detecting a focus state through the collimation telescope, and a controller for moving the focusing lens of the collimation telescope to a focal position, based on the focus state detected by the focus detector. The surveying instrument includes a single focus mode at which only one detection of the output of the focus detector and only one control operation of the controller based on the detected output are carried out, and a continuous focus mode at which a plurality of detections of the output of the focus detector and a plurality of control operations of the controller based on the detected outputs are sequentially carried out, the single focus mode and the continuous mode being selectively performed.

In an embodiment, the single focus mode is performed when an AF switch is turned ON only once, and the continuous focus mode is performed when the AF switch is turned ON twice within a predetermined time.

In an embodiment, the single focus mode is performed when an AF switch is turned ON only once, and the continuous focus mode is performed when the AF switch is turned ON continuously during a predetermined period of time.

In an embodiment, the surveying instrument further includes a mode selection switch, separate from the AF switch, which is adapted to select either the single focus mode or the continuous focus mode.

In an embodiment, the controller moves the focusing lens of the collimation telescope to a focal position corresponding to a specific default distance when the output of the focus detector detects an out-of-focus state after the controller operates.

Preferably, a default distance setting device is provided for optionally setting the default distance.

In an embodiment, the continuous focus function is stopped upon a timer lapsing.

In an embodiment, the power source of the AF apparatus is turned ON by the operation of the AF switch.

According to another aspect of the present invention, a surveying instrument having a power focus mechanism is provided, having a focusing lens and a collimation telescope, including a motor drive mechanism having an electric motor for driving the focusing lens in an optical axis direction; and a power focus mechanism which drives the focusing lens of the collimation telescope one of forwardly and rearwardly in the optical axis direction via the motor drive mechanism.

In an embodiment, a lens barrel of the collimation telescope is reversibly rotatable about a horizontal axis between a normal measurement position and a reverse measurement position, and the collimation telescope is provided on an eyepiece side of the lens barrel with a pair of PF switch knobs that are located above and below a horizontal plane passing through an optical axis of an eyepiece, at the normal measurement position and the reverse measurement position of the lens barrel of the collimation telescope.

In an embodiment, the moving speed of the focusing lens increases as the displacement of a switch knob of the pair of PF switch knobs is increased in one of the forward and rearward direction from a neutral position, wherein in the case where the switch knob is operated so as to reach a movement extremity thereof, the moving speed of the focusing lens increases as the stop time of the switch knob at the movement extremity increases.

Preferably, an MF mechanism is further included, which is adapted to manually drive the focusing lens of the collimation telescope in the optical axis direction.

Preferably, the MF mechanism is provided on a reversibly rotatable lens barrel of the collimation telescope, the MF mechanism including a manual adjustment ring exposed toward the eyepiece side of the lens barrel, the adjustment ring surrounding an eyepiece, provided on the lens barrel, when viewed from the eyepiece side in the optical axis direction, and the manual adjustment ring being located in front of the eyepiece, wherein the focusing lens can be moved in the optical axis direction by the rotation of the manual adjustment ring.

Preferably, the directions of rotation of the manual adjustment ring to advance and retract the focusing lens correspond to movement directions of the PF switch knobs to advance and retract the focusing lens, respectively.

In an embodiment, the PF switch knobs are located within the contour of the manual adjustment ring when viewed from the eyepiece side in the optical axis direction thereof.

In an embodiment, the PF switch knobs are located outside of the contour of the manual adjustment ring when viewed from the eyepiece side in the optical axis direction thereof.

In an embodiment, the manual adjustment ring is directly connected to the power focus mechanism which drives the focusing lens.

According to another aspect of the present invention, a surveying instrument having a multi-focus apparatus is provided, which has a focusing lens and a collimation telescope, including a motor drive mechanism having an electric motor which reciprocally drives the focusing lens in the optical axis direction; a focus detector for detecting the focus state of the collimation telescope; an AF controller for moving the focusing lens of the collimation telescope to a focal position through the motor drive mechanism, based on the focus state detected by the detection device; and a power focus mechanism which electrically drives the focusing lens of the collimation telescope through the motor drive mechanism in the optical axis direction, independently of the output of the focus detector.

In an embodiment, a lens barrel of the collimation telescope is reversibly rotatable about a horizontal axis between a normal measurement position and a reverse measurement position, wherein the collimation telescope is provided on an eyepiece side of the lens barrel with a pair of PF switch knobs that are located above and below a horizontal plane passing through an optical axis of an eyepiece, at the normal measurement position and the reverse measurement position of the lens barrel of the collimation telescope, respectively.

In an embodiment, the pair of PF switch knobs are each provided with a finger engagement concave portion that is curved inward toward the center of the lens barrel of the collimation telescope, so that one of a forward and reverse movement of the finger engagement concave portion from a neutral position gives an operation signal to the motor drive mechanism to move the focusing lens in a corresponding one of a forward and rearward direction.

In an embodiment, the moving speed of the focusing lens increases as the displacement of a switch knob of the pair of PF switch knobs is increased in one of a forward and rearward direction from a neutral position, wherein in the case where the switch knob is operated so as to reach a movement extremity thereof, the moving speed of the focusing lens increases as the stop time of the switch knob at the movement extremity increases.

Preferably, the lens barrel is provided on the eyepiece side thereof with an AF switch, between the pair of PF switch knobs, wherein the AF switch is used to operate the AF controller.

In an embodiment, the center of the eyepiece is deviated in the horizontal direction from the center of the collimation telescope, the AF switch being located on the lens barrel next to the eyepiece.

In an embodiment, an MF mechanism is further included for manually moving the focusing lens of the collimation telescope in the optical axis direction.

In an embodiment, an MF mechanism is further included which is provided, on a reversibly rotatable lens barrel of the collimation telescope, with a manual adjustment ring exposed toward the eyepiece side of the lens barrel, the adjustment ring surrounding an eyepiece, provided on the lens barrel, when viewed from the eyepiece side from the optical axis direction, and the manual adjustment ring being located in front of the eyepiece, wherein the focusing lens can be moved in the optical axis direction by the rotation of the manual adjustment ring.

Preferably, the directions of rotation of the manual adjustment ring to advance and retract the focusing lens correspond to movement directions of the PF switch knobs to advance and retract the focusing lens, respectively.

In an embodiment, the PF switch knobs are located within the contour of the manual adjustment ring when viewed from the eyepiece side in the optical axis direction thereof.

In an embodiment, the PF switch knobs are located outside of the contour of the manual adjustment ring when viewed from the eyepiece side in the optical axis direction thereof.

Preferably, the manual adjustment ring is directly connected to the power focus mechanism.

The present disclosure relates to subject matter contained in Japanese Patent Applications No. 2000-139516 (filed on May 12, 2000), No. 2000-140650 (filed on May 12, 2000), and No. 2000-140651 (filed on May 12, 2000), which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

The preferred embodiments of the present invention will be discussed below with reference to the drawings.

<First Embodiment>

Figure 1:
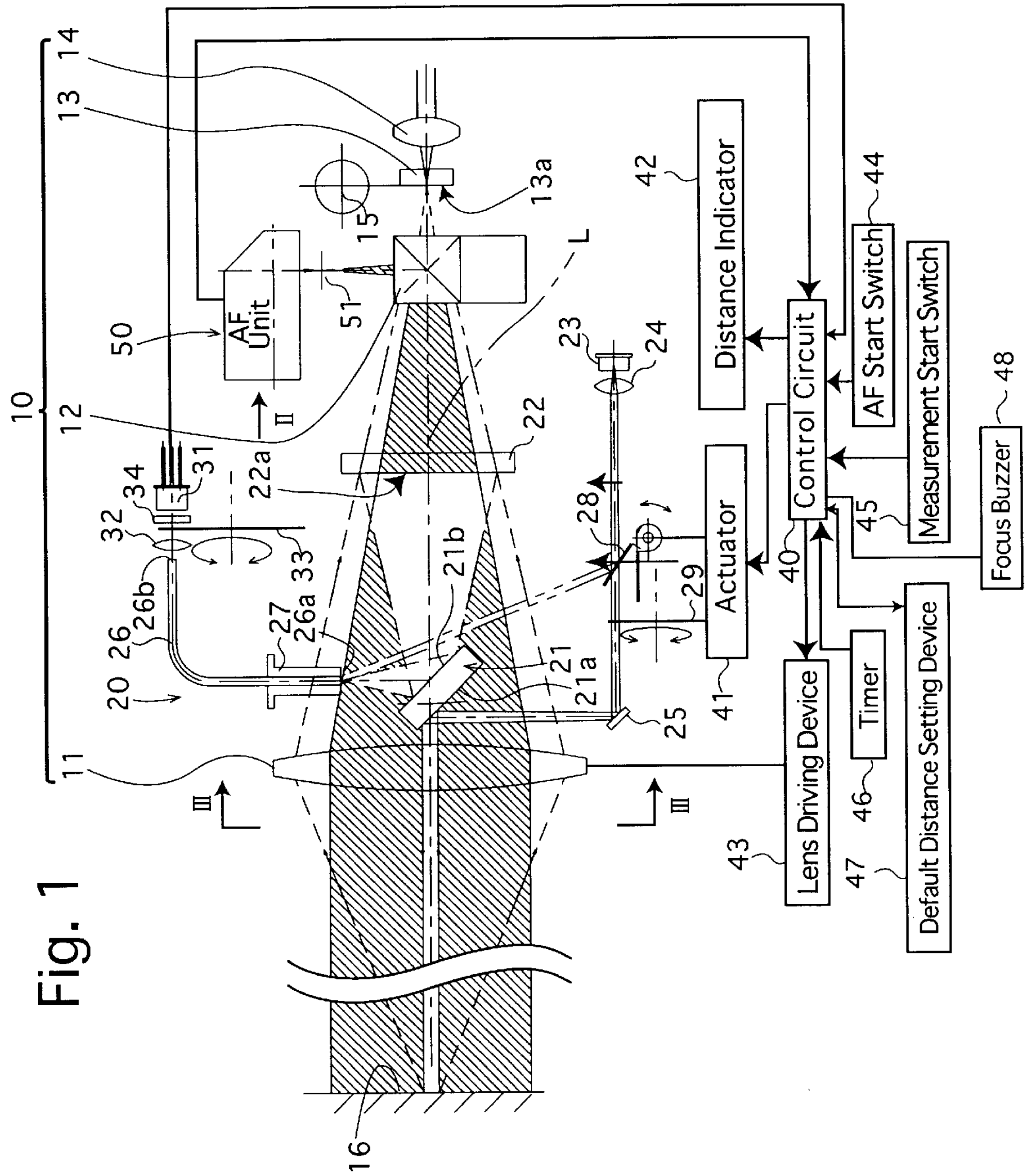
FIG. 1 is a systematic connection diagram of a surveying instrument having an AF apparatus according to a first embodiment of the present invention.
Figure 2:
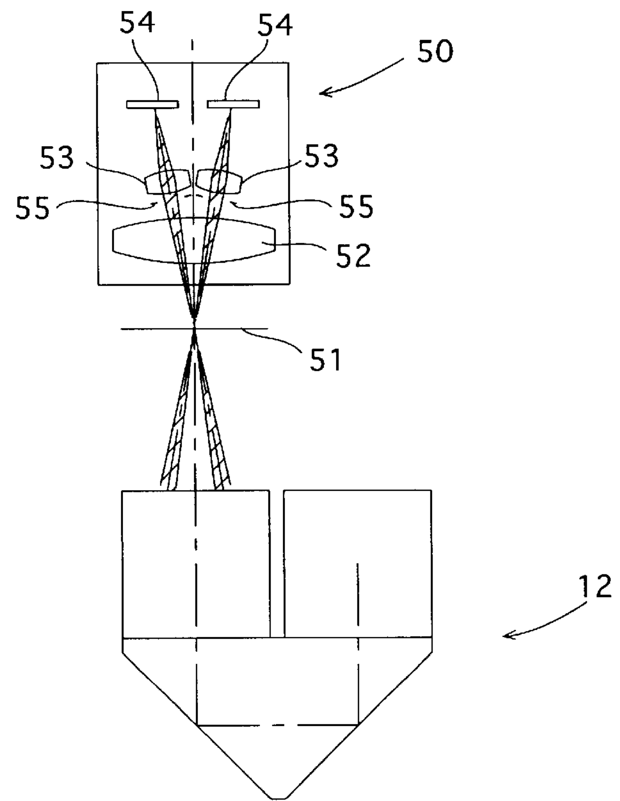
FIG. 2 is a conceptual view of a focus detector (AF unit, phase difference type focus detector), as viewed in the direction of an arrow II in FIG. 1.
Figure 3:
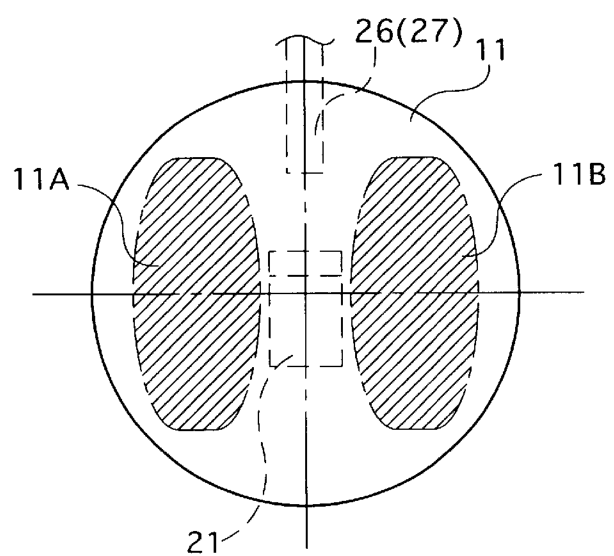
FIG. 3 is a schematic view showing a positional relationship among a pair of pupil areas on an objective lens of a focus detector, a reflection mirror, and a light receiving fiber, as viewed from the direction of the arrows III—III in FIG. 1.

FIGS. 1 through 3 show a first embodiment of a surveying instrument having an AF apparatus, according to the present invention.

A collimation telescope 10 includes an objective lens (focusing lens) 11, an image erecting optical system (Porro prism) 12, a focusing plate 13, and an eyepiece lens 14, in that order from the object side (front side). The focusing plate 13 is provided at its center portion with a reticle (collimation axis) 15 for accurate sighting. The objective lens 11 is movable in the direction of the optical axis L, so that an in-focus image of the sighting object 16 can be formed on the surface 13*a* of the focusing plate 13, adjacent to the objective lens 11, by adjusting the position of the objective lens 11 in accordance with the distance of the object 16. A viewer can view the image, whose size is enlarged, on the focusing plate 13 through the eyepiece lens 14.

The Porro prism 12 is provided with a beam splitting surface which splits the incident light bundle into two light bundles, so that one of the two light bundles proceeds toward a phase-difference detection type AF detection unit (focus detecting device) 50 while the other light bundle proceeds toward the eyepiece lens 14. The AF detection unit 50 detects the focus state (i.e., the amount of defocus, such as front focus or rear focus, etc.) of the focus detection surface 51 which is optically equivalent to the focusing plate 13. FIG. 2 which shows a conceptual view of the AF detection unit 50. The object image formed on the focus detection surface 51 by the objective lens 11 is split by a pair of separator lenses (imaging lenses) 53, which are spaced from one another at a distance corresponding to the base length, via a condenser lens 52. A pair of split images are re-formed on a pair of CCD line sensors 54.

The CCD line sensors 54 are provided with a photoelectric transducer array having a number of photoelectric transducers which coverts the received object light into electric signals, integrates (or accumulates) the charges thus obtained, and outputs the integrated charges, as AF sensor data, to a control circuit (controller/AF controller) 40. The control circuit 40 carries out a predetermined calculation to determine the defocus amount in accordance with a pair of AF sensor data and moves the objective lens to an in-focus position via the lens driving device 43. The calculation of the defocus amount is well known by those skilled in the art.

In the AF detection unit 50, the focal point is detected, based on a pair of object images formed on the line sensors 54, by the light bundles of the object image passing through a pair of separate pupil portions 11A and 11B (FIG. 3) on the objective lens 11 which are determined by separator masks 55 located in the vicinity of the separator lenses 53. Note that the hatched areas in FIGS. 1 and 3 conceptually represent the light path portions corresponding to the pupil portions 11A and 11B.

The surveying instrument having the AF apparatus in the illustrated embodiment has a single focus mode, in which only one AF operation mentioned above is carried out by the control circuit 40, and a continuous focus mode in which a plurality of AF operations are sequentially carried out by the control circuit 40. The control circuit 40 carries out the AF operation in accordance with a performed focus mode. Connected to the control circuit 40 are an AF start switch 44, a measurement start switch 45, a timer 46, a default distance setting device 47, and a focus buzzer 48. The single focus mode is set when the AF start switch 44 is turned ON once, and the continuous focus mode is set when the AF start switch 44 is turned ON twice within a predetermined time. The power source of the AF apparatus is turned ON when the AF start switch 44 is depressed.

At the single focus mode, only one detection of the output of the AF detection unit 50 and only one calculation/control by the control circuit 40 based on the detection of the output of the AF detection unit 50 are carried out. Consequently, the objective lens 11 is moved to the focal position corresponding to the distance of the object 16. When the in-focus state is obtained, the buzzer 48 operates to make an audible sound. When the AF operation is completed, the power source of the AF apparatus is turned OFF.

At the continuous focus mode, a plurality of detections of the output of the AF detection unit 50 and a plurality of calculation/control operations by the control circuit 40 based on the detections of the output of the AF detection unit 50 are sequentially carried out within a predetermined time (e.g., 1 minute). Consequently, the objective lens 11 is moved to the focal position corresponding to the object distance of the object 16 each time the focus detection is carried out. Therefore, even if the object 16 is moving, the in-focus state can be continuously obtained. When an in-focus state is obtained, the buzzer 48 operates to make an audible sound. The continuous AF operations are continuously carried out for 1 minute, and the power source of the AF apparatus is turned OFF after a lapse of 1 minute.

The default distance setting device 47 is adapted to set and store an optional distance. In either focus mode, if the output of the AF detection unit 50 after the completion of the AF operation mentioned above represents "out-of-focus", the objective lens 11 is moved to the focus position corresponding to the distance set and stored by the default distance setting device. If the object distance which is frequently used is set and stored in the default distance setting device, it is possible to prevent the object image from being extremely out of focus even if the focusing fails.

The collimation telescope 10 is provided with a self-contained optical rangefinder 20 as a distance measuring device (distance meter). The optical rangefinder 20 is constructed as described in the following. Namely, a light emitting/receiving mirror 21 and a wavelength selection filter (color filter) 22 which permits the visible light to pass therethrough and reflects measuring light, are arranged in this order with respect to the objective lens 11 of the collimation telescope 10. The light emitting/receiving mirror 21 and the wavelength selection filter 22 constitute the optical rangefinder 20. The light emitting/receiving mirror 21 is made of a plane-parallel mirror located on the optical axis of the objective lens 11. The plane-parallel mirror includes a light emitting mirror 21*a* on the surface adjacent to the objective lens 11, and a light receiving mirror 21*b* on the surface adjacent to the color filter 22.

The light emitting element 23 of the optical rangefinder 20 emits internal reference light of a specific wavelength which is made incident upon the light emitting surface 21*a* of the light emitting/receiving mirror 21 via a collimator lens 24 and a stationary mirror 25. The measuring light incident upon the light emitting mirror surface 21*a* travels along the optical axis L of the objective lens 11 toward the sighting object 16.

The color filter 22 reflects the measuring light, reflected by the sighting object 16 and transmitted through the objective lens 11, at the surface 22*a* of the color filter 22 which is provided adjacent to the objective lens 11, toward the light receiving mirror 21*b*. The light receiving mirror 21*b* reflects the measuring light so as to be incident upon an incidence surface 26*a* of a light receiving fiber 26. A holder 27 holds the light receiving fiber 26 and is secured together with the light emitting/receiving mirror 21 in a space behind the objective lens 11 by a securing device (not shown).

A switching mirror 28 and a light emitting ND filter 29 are provided on the measuring light path between the light emitting element 23 and the stationary mirror 25. The switching mirror 28 is adapted to switch the direction of the light emitted from the light emitting element 23 toward the stationary mirror 25 so that the emitted light is utilized as measuring light, or directly toward the incidence surface 26*a* of the light receiving fiber 26 so that the emitted light is utilized as internal reference light. The light emitting ND filter 29 is adapted to adjust the quantity of the measuring light to be made incident upon the sighting object 16.

A condenser lens 32, a light receiving ND filter 33, and a band-pass filter 34 are arranged in that order between the light emission surface 26*b* of the light receiving fiber 26 and the light receiving element 31. The light receiving element 31 is connected to the control circuit 40 which is connected to an actuator 41 of the switching mirror 28 and a measurement indicator 42.

The position of the pupil portions 11A and 11B of the objective lens 11 is determined so as not to interfere with the light emitting/receiving mirror 21 of the optical rangefinder 20 or the light receiving fiber 26 (fiber holder 27) (and support members thereof), as can be seen in FIG. 3.

In the optical rangefinder 20 constructed as above, the control circuit 40 switches the position of the switching mirror 28 via the actuator 41 between a position in which the light (measuring light) from the light emitting element 23 reaches the stationary mirror 25 and a position in which the light (internal reference light) from the light emitting element 23 is reflected toward the incidence surface 26*a* of the light receiving fiber 26. The measuring light incident upon the stationary mirror 25 is made incident upon the object 16 via the light emitting mirror 21*a* and the objective lens 11. The light reflected from the object 16 is made incident upon the incidence surface 26*a* via the objective lens 11, the color filter 22 and the light receiving mirror 21*b*.

The measuring light reflected from the object 16 and made incident upon the incidence surface 26*a* and the internal reference light incident directly upon the incidence surface 26*a* by the switching mirror 28 are received by the light receiving element 31, so that the control circuit 40 detects the phase difference or time difference between the measuring light and the internal reference light to thereby calculate the distance to the object 16. The object distance thus obtained is indicated in the distance indicator 42. The determination of the object distance based on a phase difference between the outgoing light and the reflected (return) light and the initial phase of the internal reference light or a time difference between the outgoing light and the reflected light is known in the art.

Figure 4:
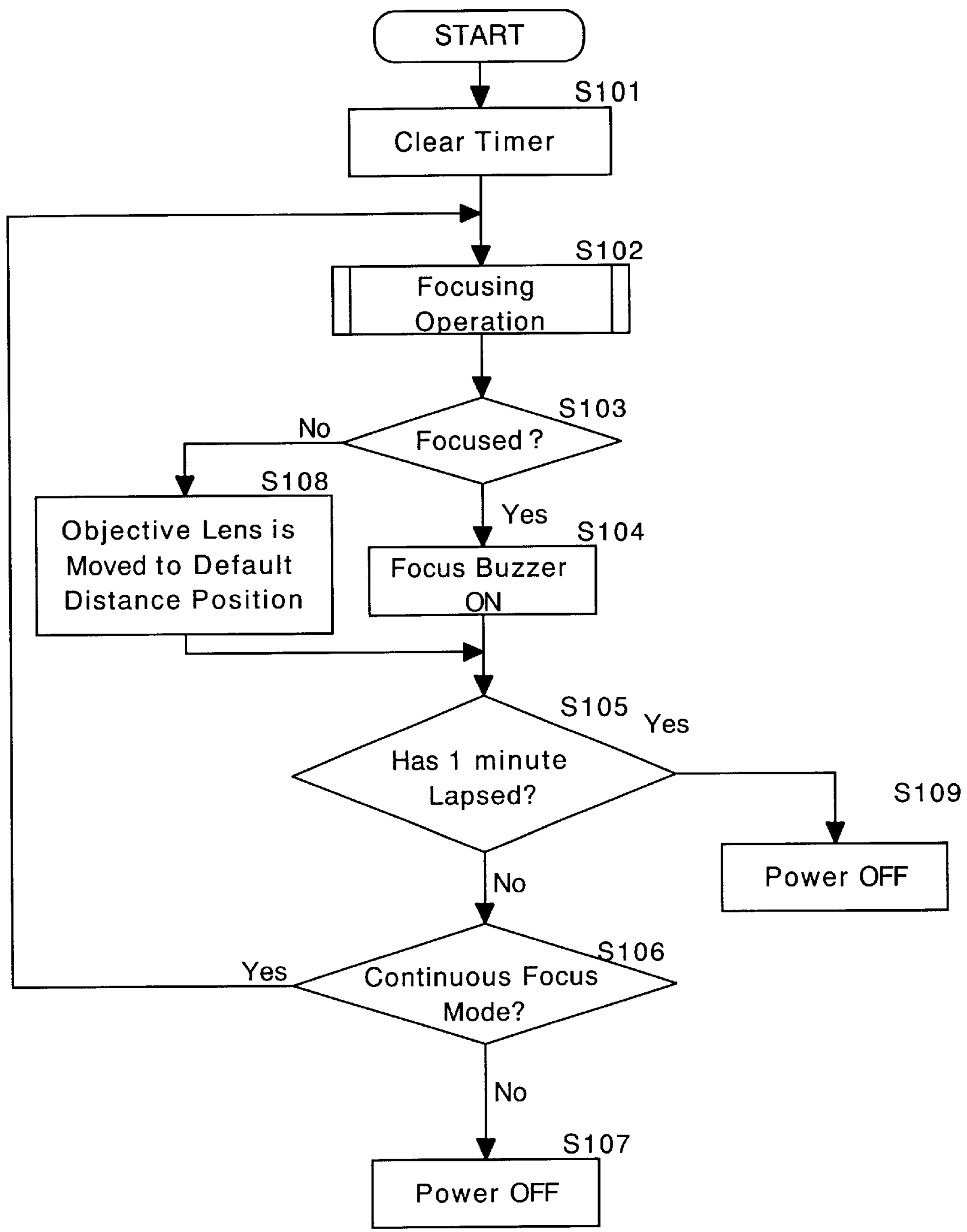
FIG. 4 is a flow chart of the AF operation by a control circuit.

FIG. 4 shows a flow chart of the operation of the surveying instrument having an AF apparatus described above. The operation shown in the flow chart is carried out by the control circuit 40 when the AF start switch 44 is depressed.

The timer 46 is cleared (initialized) at step S101 in order to perform the focusing operation at step S102. At step S103, it is checked whether focusing is completed. If the focusing is completed (S103; Yes), the focus buzzer 48 is turned ON to make an audible sound (S104). If an in-focus state is not established (S103; No), the objective lens 11 is moved to a focal position corresponding to the distance set and stored in the default distance setting device 47 (S108).

Thereafter, whether or not 1 minute (predetermined time) has lapsed is checked by the timer 46 (S105). If 1 minute has not lapsed (S105; No), it is checked whether or not the current mode is the continuous focus mode, i.e., whether or not the AF start switch 44 has been depressed twice (S106). If the current mode is the continuous focus mode (S106; Yes), the control is returned to S102 to repeat the focusing operation. If the current mode is not the continuous focus mode (S106; No), the power source of the AF apparatus is turned OFF (S107). If 1 minute has lapsed (S105; Yes), the power source of the AF apparatus is turned OFF (S109).

Figure 5:
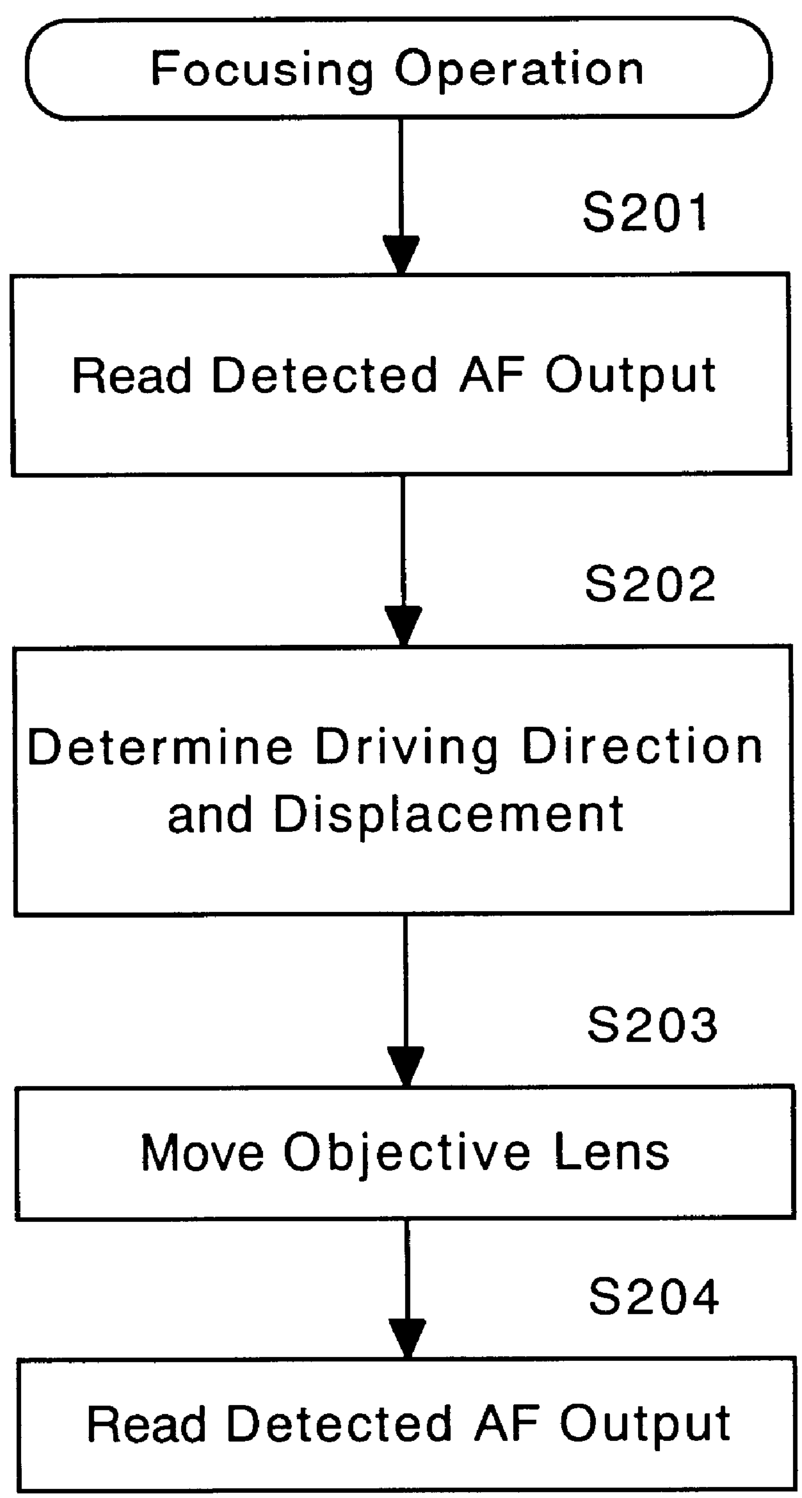
FIG. 5 is a flow chart of the focusing operation shown in FIG. 4.

FIG. 5 shows a flow chart of the focusing operation shown at S102 in FIG. 4. In the operation shown in FIG. 5, the detection signal from the AF detection unit 50 is read by the control circuit 40 (S201). Thereafter, the control circuit 40 determines the displacement and direction of the movement of the objective lens 11 in accordance with the detection signal (S202). Consequently, the objective lens 11 is moved by the displacement and in the direction thus determined (S203). The detection signal of the AF detection unit 50 is read again to detect whether or not the in-focus state is established (S204).

The distance measuring operation of the surveying instrument having an AF function, as construed above, is carried out as follows.

Step 1:

The operator aligns the optical axis L of the collimation telescope 10 so as to be substantially coincident with the sighting object 16 while viewing the object 16 through a collimator (not shown) attached to the collimation telescope 10.

Step 2:

The single focus mode or continuous focus mode is performed in accordance with a stationary object or a moving object. The AF start switch 44 is turned ON only once at the single focus mode and twice at the continuous focus mode, to carry out the above-described operations to thereby move the objective lens 11 to the focal position. Note that the power source of the AF apparatus is turned ON when the AF start switch 44 is depressed. If the in-focus state is not attained, the focusing operation is carried out in accordance with the default distance set by the default distance setting device 47.

Step 3:

The operator views the reticle 15 of the focusing plate 13 through the eyepiece lens 14 at the in-focus state or default distance focus state and aligns the reticle 15 so as to be coincident with the object 16. Consequently, it is possible to correctly project the measuring light of the optical rangefinder 20 onto the object 16.

Step 4:

The measurement start switch 45 is depressed to carry out the distance measuring operation via the optical rangefinder 20, so that the measurement is indicated in the distance indicator 42.

In the measuring operation described above, even if the object 16 is moving, if the continuous focus mode is selected, the in-focus state of the object can be continuously obtained without repeatedly turning the AF start switch 44 ON each time the object moves, thus resulting in an highly effective focusing operation. Moreover, if the default distance is pre-set and pre-stored in the default distance setting device 47, no large amount of defocus is produced. Furthermore, since the execution time of the AF operation at the continuous focus mode is restricted, the electrical power consumption can be reduced.

Although the objective lens 11 serves as a focusing lens in the embodiment illustrated in FIG. 1, it is possible to provide a separate focusing lens between the objective lens 11 and the eyepiece lens 14.

Although the single focus mode and the continuous focus mode are selected in accordance with one depression and two depressions of the AF start switch 44 in the illustrated embodiment, it is alternatively possible to provide a focus mode setting switch separate from the AF start switch 44 in order to switch the focus mode by the focus mode setting switch. In this alternative, it is preferable that a focus mode indicator be provided to indicate the selected focus mode.

Moreover, although the time interval of the continuous AF operations is 1 minute in the illustrated embodiment, the interval may be shorter or longer than 1 minute. Alternatively, it is possible to provide a mechanism which can set an optional interval.

As can be understood from the above description, according to a surveying instrument of the first embodiment of the present invention, the AF operation can be easily carried out in both the surveying operation for a sighting object which is not moved, and for a pile driving operation for an object which is moved.

<Second Embodiment>

FIGS. 6 through 13 show a second embodiment of a surveying instrument (total station) having a PF function, according to the present invention. In the second embodiment, the elements corresponding to those in the first embodiment are designated with the same reference numerals, and no duplicate explanation thereof will be given.

Figure 6:
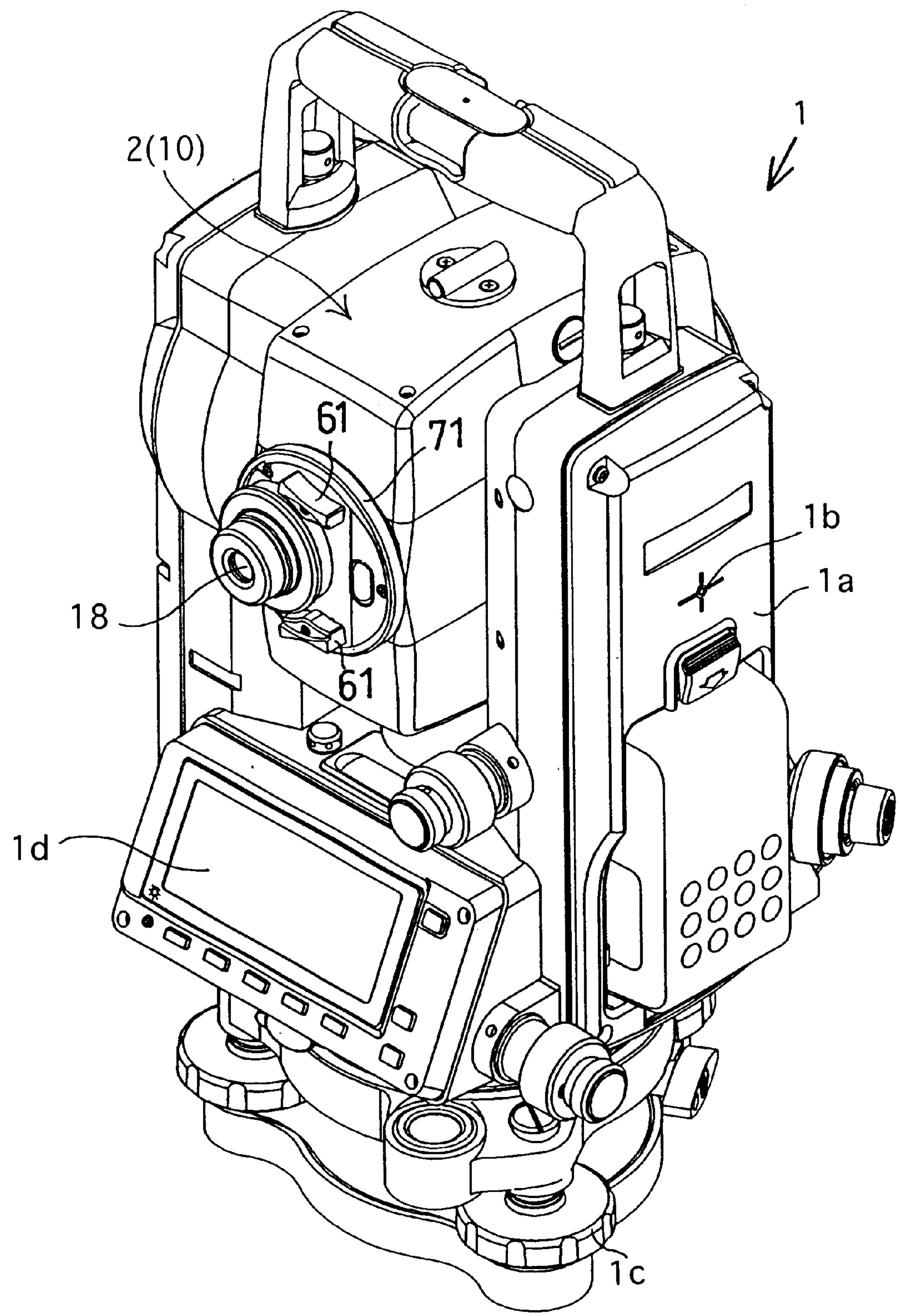
FIG. 6 is a perspective view of a collimation telescope of a total station, viewed from the eyepiece side, according to a second embodiment of the present invention.
Figure 7:
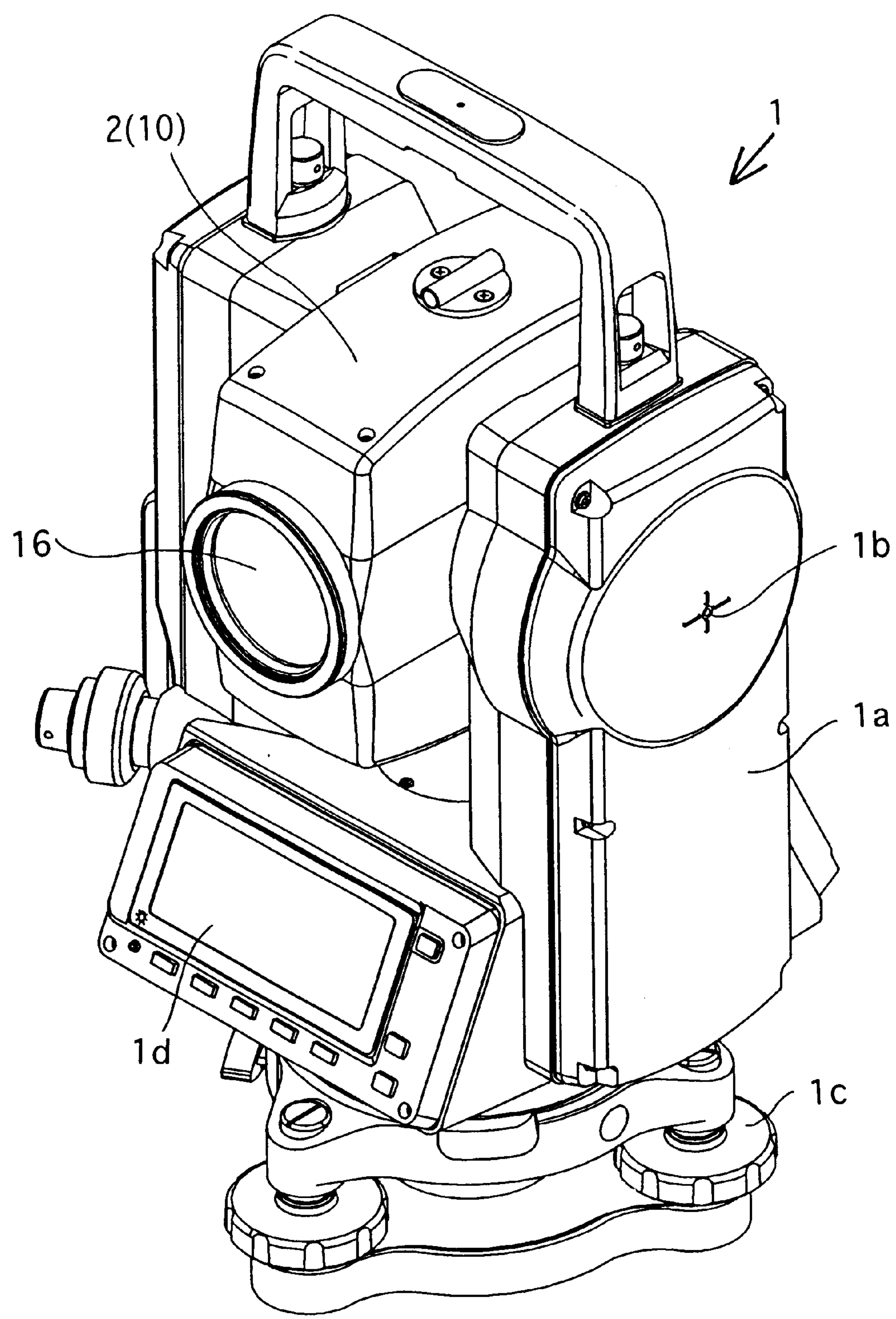
FIG. 7 is a perspective view of a collimation telescope of a total station shown in FIG. 6, viewed from the objective lens side.

As shown in FIGS. 6 and 7, the surveying instrument 1 is provided with a collimation telescope 10 which is attached to the body frame 1*a* so as to rotate about the horizontal axis 1*b*. The collimation telescope 10 can be selectively moved (rotated) between a normal measurement position shown in FIGS. 6 and 7 and a reverse measurement position which is obtained by reversing (rotating) the collimation telescope 10 about the horizontal axis 1*b* with respect to the normal measurement position. The collimation telescope 10 is provided with an objective lens 16 and an eyepiece lens 18 at the front and rear ends thereof, respectively. The body frame 1*a* is provided with components indispensable to a surveying instrument, such as leveling screws 1*c*, and an operation display portion 1*d*. Moreover, the total station has distance and angle measuring functions, but these functions are not the subject of the present invention and hence no explanation therefor is given herein.

Figure 11:
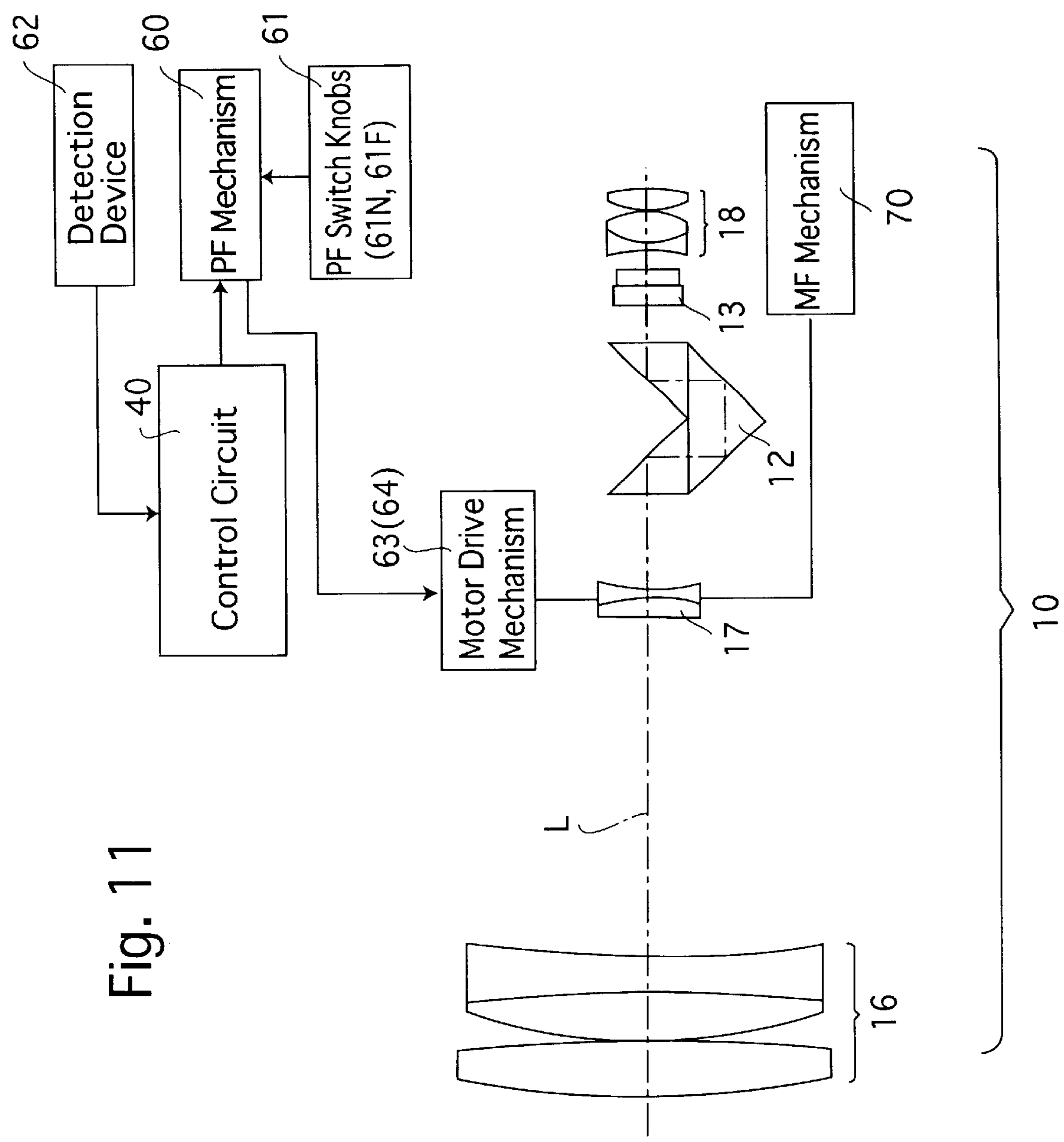
FIG. 11 is a systematic connection diagram of a collimation telescope of a surveying instrument according to a second embodiment of the present invention.

FIG. 11 shows an optical system of the collimation telescope 10 which includes the objective lens 16, the focusing lens 17, the image erecting optical system (Porro prism) 12, the focusing plate 13, and the eyepiece 18. These elements are arranged in this order from the object side. The focusing plate 13 is provided thereon with a reticle (collimation axis) which is used as a reference for sighting. The focusing lens 17 is movable in the optical axis direction, so that an image of the sighting object can be formed on the surface of the focusing plate 13 adjacent the objective lens 16 by adjusting the position of the focusing lens 17 in accordance with the distance of the object. A viewer can view the image, whose size is enlarged, on the focusing plate 13 through the eyepiece lens 18.

The focusing lens 17 is moved in the forward and rearward axial direction via a PF mechanism 60 and an MF mechanism 70. The PF mechanism 60 includes an advance switch contact 61N and a retraction switch contact 61F, which are operated by PF switch knobs (levers) 61. The control circuit 40 causes the electric motor 64 provided in the motor drive mechanism 63 to rotate in the forward direction to move the focusing lens 17 forwardly in the optical axis direction when the advance switch contact 61N is ON (when focusing on a close object). When the retraction switch contact 61F is ON, the motor 64 is revered by the control circuit 40 to move the focusing lens 17 rearwardly in the optical axis direction L (when focusing on a distant object).

Figure 10:
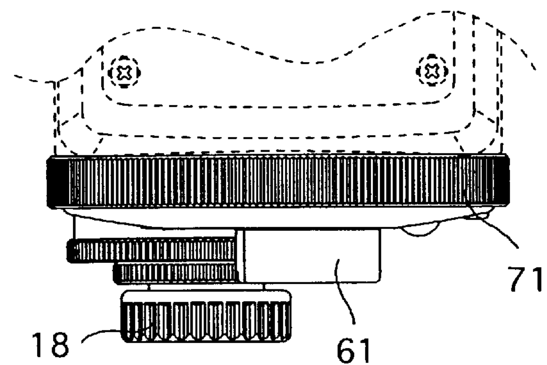
FIG. 10 s a plan view of FIG. 8.
Figure 9:
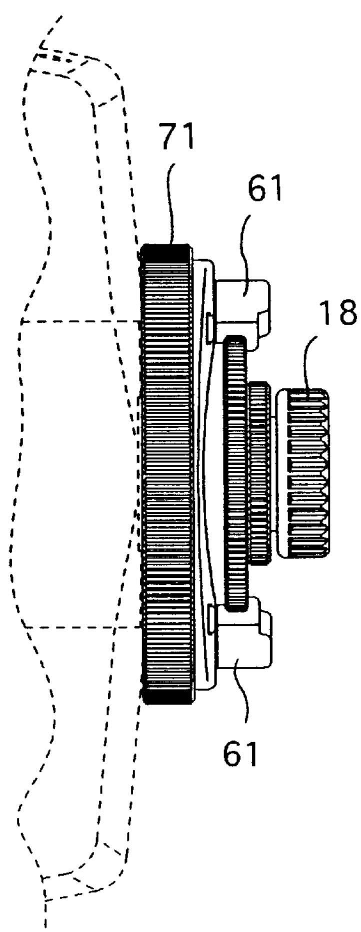
FIG. 9 is a right side elevational view of FIG. 8.
Figure 8:
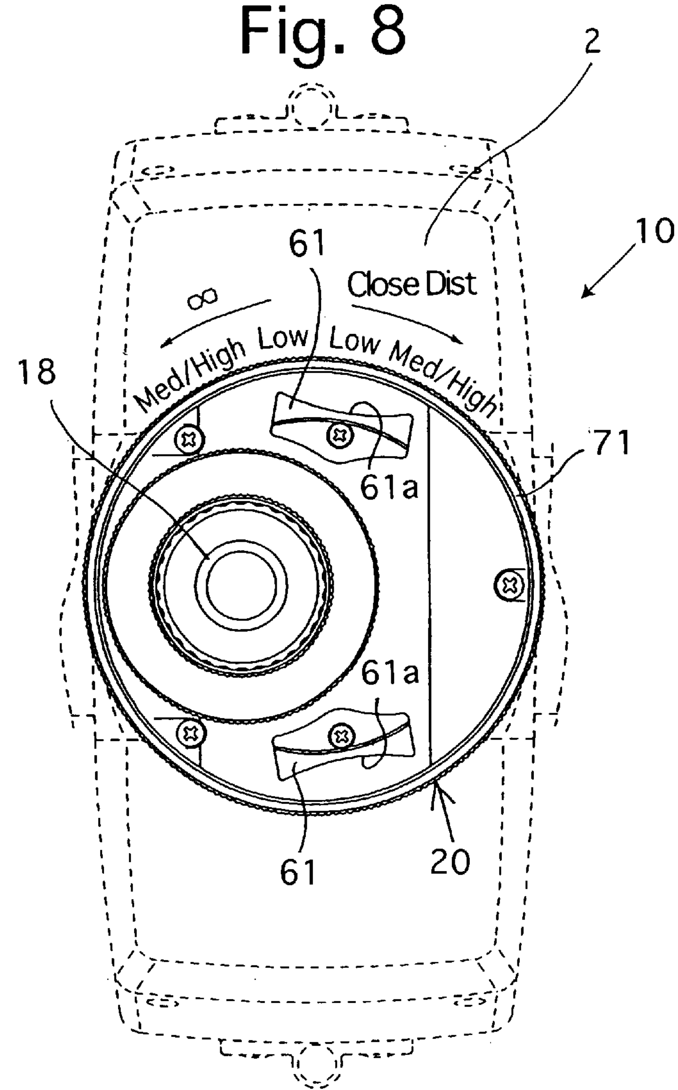
FIG. 8 is a front elevational view of an eyepiece portion shown in FIG. 7.

FIGS. 8 through 10 show the arrangement of the PF switch knobs 61 by way of example. As mentioned above, the collimation telescope 10 is reversibly rotatable about the horizontal axis 1*b* between the normal measurement position and the reverse measurement position. A pair of PF switch knobs 61 are provided on the lens barrel 2 surface on the eyepiece 18 side, so that they are located above and below a horizontal plane passing through the optical axis of the eyepiece 18 at the normal measurement position and the reverse measurement position of the collimation telescope 10 and that the PF switch knobs 61 are located within the contour of the focus adjusting ring 71, as viewed from the optical axis direction of the eyepiece 18. The PF switch knobs 61 are each provided with a finger engagement concave portion (recess) 61*a* that are inwardly curved toward the center of the lens barrel 2 of the telescope 10, as shown in FIG. 8. When each of the PF switch knobs 61 is rotated in the forward or reverse direction from its neutral position, the operation signal is supplied to the motor drive mechanism 63 to cause the forward or rearward axial movement of the focusing lens 17 (i.e., to selectively turn ON the advance switch contact 61N and the retraction switch contact 61F).

For example, in FIG. 8, the rotation of the PF switch knob 61 in the clockwise direction causes the retraction switch contact 61F to be turned ON to thereby move the focusing lens 17 in a direction toward the focal position for a close object. The rotation of the PF switch knob 61 in the counterclockwise direction causes the advance switch contact 61N to be turned ON to thereby move the focusing lens 17 in the direction toward the focal position for an infinite object. Due to the presence of two PF switches 61, it is possible to operate reliably and easily either PF switch regardless of the position of the collimation telescope 10, i.e., either at the normal measurement position or the reverse measurement position. Note that the finger engagement concave portions 61*a* of the pair of PF switch knobs 61 can be replaced with convex portions (projections) which are curved outwardly in the radial direction.

The pair of PF switch knobs 61 are set so that the moving speed of the focusing lens 17 increases as the displacement thereof from the neutral position in the forward or rearward direction increases, and after the PF switch knobs reach the extremities of the movement, the moving speed of the focusing lens 17 increases as the stop time at the extremities increases. Namely, the PF mechanism 60 includes a detection device 62 which detects the displacement of the PF switch knobs 61 from the neutral position in the forward or rearward direction. The detection device 62 is connected to the control circuit 40. The control circuit 40 includes a memory in which the rotational speed of the motor 64 corresponding to the displacement of the PF switch knobs 61 from the neutral position in the forward and rearward direction and the stop time is stored, wherein the moving speed of the focusing lens 17 increases as the displacement of the PF switch knobs increases and as the stop time at the extremities increases.

Since the eyepiece 18 deviates from the optical axis of the objective lens 16 due to the Porro prism 12 being provided in the collimation telescope 10, the center of the eyepiece 18 is located eccentrically from the center of the collimation telescope 10 in the horizontal direction, as shown in FIG. 8.

Figure 12:
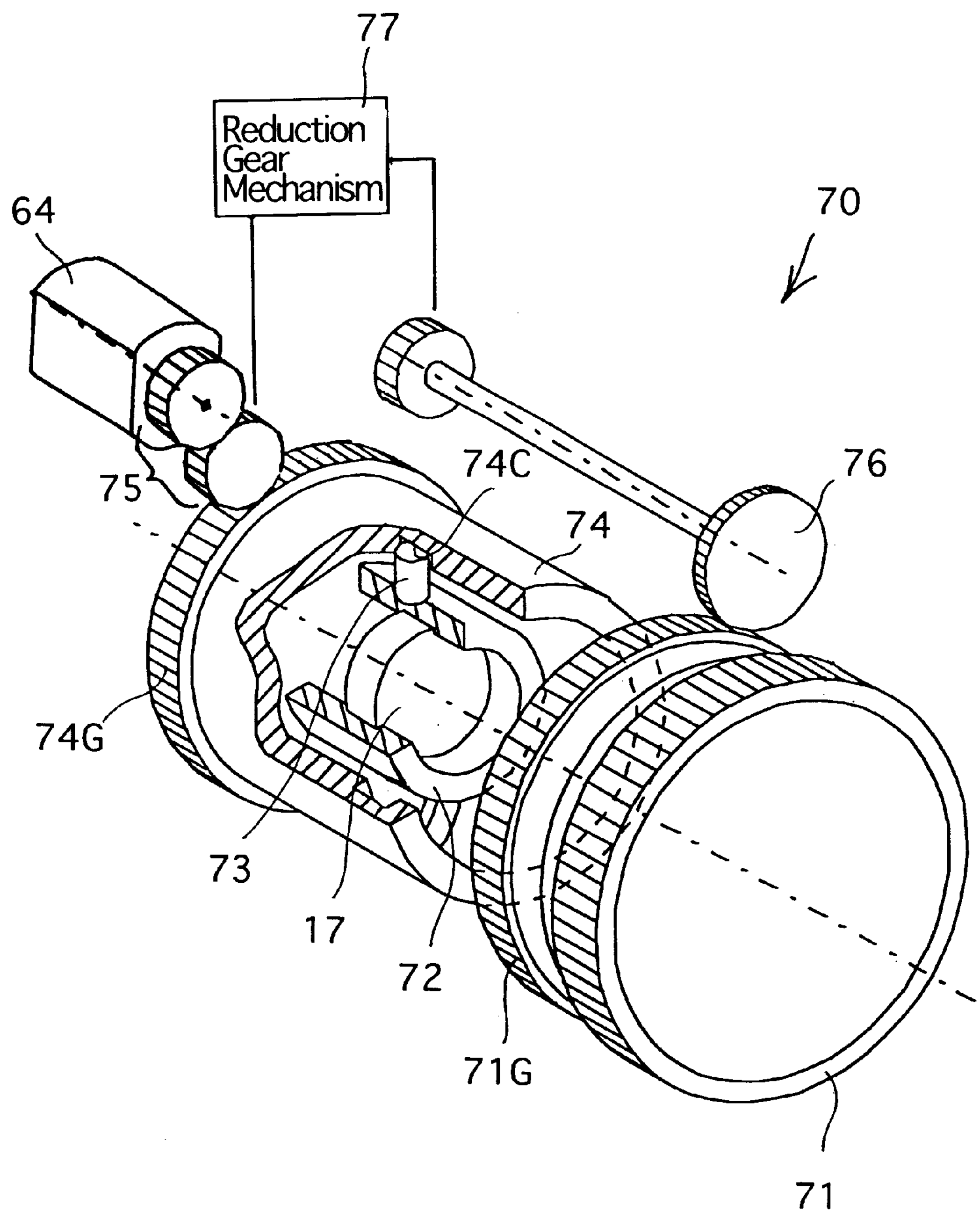
FIG. 12 is a perspective view of an example of a drive mechanism of a focusing lens in a collimation telescope according to a second embodiment of the present invention.

The MF mechanism 70 moves the focusing lens 17 forwardly or rearwardly in the optical axis direction in accordance with the forward or reverse rotation of the focusing ring (manual focus adjusting ring) 71 which is rotatably supported in the vicinity of the end of the collimation telescope 10 on the eyepiece 18 side. The focusing ring 71 is coaxial to the optical axis L of the objective lens 16. FIG. 12 shows an example of an arrangement in which a lens frame 72 which holds the focusing lens 17 is supported so as to move linearly in the optical axis direction through a linear movement guide mechanism (not shown). The lens frame 72 is provided with a radially extending follower pin 73 which is fitted in a lead groove (cam groove) 74*c* of a cam ring 74 whose center of rotation is located on the optical axis. When the rotation of the cam ring 74 in the forward or reverse direction takes place, the focusing lens 17 is moved linearly in the forward or rearward direction along the optical axis L.

The cam ring 74 is provided, on its outer peripheral surface at the end thereof, with a gear 74G which is in mesh with a gear train 75 which is driven by the electric motor 64. The focusing lens 17 is moved linearly in the optical axis direction in accordance with the forward or reverse rotation of the motor 64.

The focusing ring 71 is provided with a coaxial gear 71G which is in mesh with a pinion 76 which is connected to the gear train 75 of the motor 64 via a reduction gear mechanism 77. Namely, when the focusing ring 71 is rotated, the axial movement of the focusing lens 17 takes place via the cam ring 74. At the same time, the drive shaft of the motor 64 is rotated. Conversely, when the motor 64 is driven, the focusing ring 71 is rotated via the gear train 75, the reduction gear mechanism 77, the pinion 76 and the gear 71G. As can be understood from the foregoing, the MF operation is carried out by rotating the focusing ring 71 and the PF operation is carried out by driving the motor 64, without switching the PF operation and the MF operation. This relationship (arrangement) is achieved by the focusing ring 71 constantly being connected with the PF mechanism 60.

The direction of the movement of the focusing lens 17 with respect to the direction of rotation of the focusing ring 71 corresponds to the direction of the movement of the focusing lens 17 with respect to the direction of the operation of the PF switch knobs 61. Namely, in the example shown in FIG. 8, when the focusing ring 71 is rotated in the clockwise direction, the focusing lens 17 is moved toward the focal position for a close object. Conversely, when the focusing ring 71 is rotated in the counterclockwise direction, the focusing lens 17 is moved toward the focal position for an infinite object. Namely, the direction of the movement of the focusing lens 17 is identical to that determined by the direction of the operation of the PF switch knobs 61. With this structure, the focusing by the PF operation and the focusing by the MF operation can be carried out in the same fashion.

Figure 13:
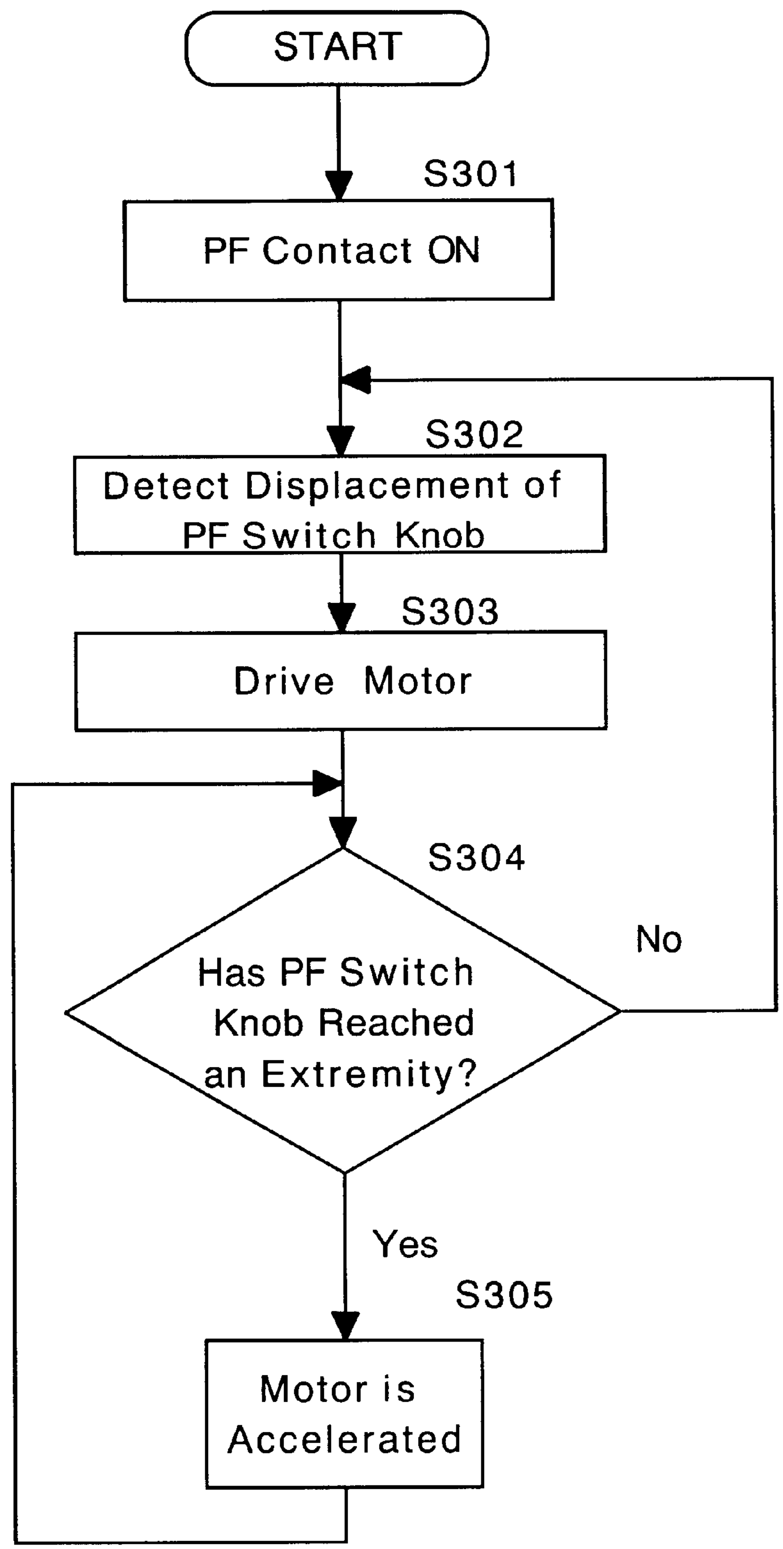
FIG. 13 is a flow chart of the operations of a surveying instrument according to a second embodiment of the present invention, by way of example.

FIG. 13 shows a flow chart of the operation of the surveying instrument having the PF function described above, by way of example. The operation in this flow chart is performed by the control circuit 40.

When the PF switch knob 61 is operated to turn the advance switch contact 61N ON or the retraction switch contact 61F ON (S301), the detection device 62 detects the displacement of the PF switch knob 61 from the neutral position (S302), so that the motor 64 is driven (S303) in the direction corresponding to the operated switch contact and at a speed of rotation corresponding to the displacement, with reference to data stored in the memory (not shown).

Thereafter, it is checked whether or not the PF switch knob 61 has reached one of the knob-movement extremities thereof (S304). If the PF switch knob 61 reaches one of the knob-movement extremities (S304; Yes), the motor 41 is accelerated (S305). If the PF switch knob 61 has not reached one of the extremities (S304; No), the control is returned to S302.

<Third Embodiment>

Figure 15:
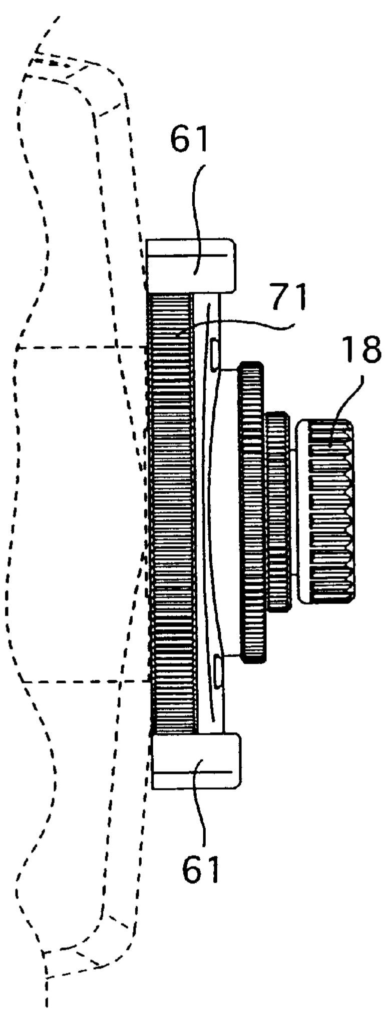
FIG. 15 is a right side view of FIG. 14.
Figure 14:
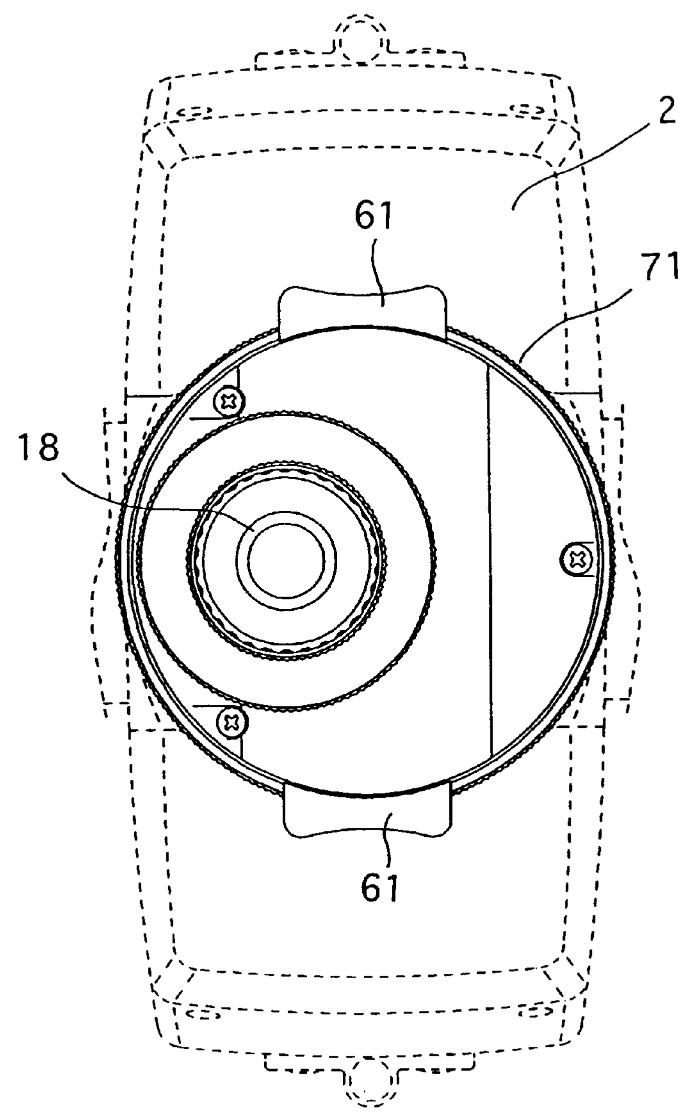
FIG. 14 front elevational view of an eyepiece portion according to a third embodiment.

FIGS. 14 and 15 show a third embodiment of a surveying instrument having a PF function according to the present invention. The third embodiment is different from the second embodiment shown in FIG. 6 in that a pair of PF switch knobs 61 protrude from the focusing ring 71 in the third embodiment (see FIG. 14). According to the third embodiment, it is possible to arrange members or elements without being restricted by the position of the PF switch knobs 61.

As can be understood from the above discussion, according to the second or third embodiment of the present invention, a surveying instrument having a PF function in which the motor-driven focusing operation is carried out can be provided.

<Fourth Embodiment>

FIGS. 16 through 21 show a fourth embodiment of a surveying instrument (total station) having a multi-focus function according to the present invention. In the fourth embodiment, the elements corresponding to those in the second embodiment are designated with the same reference numerals, and hence, no duplicate explanation thereof will be given.

Figure 16:
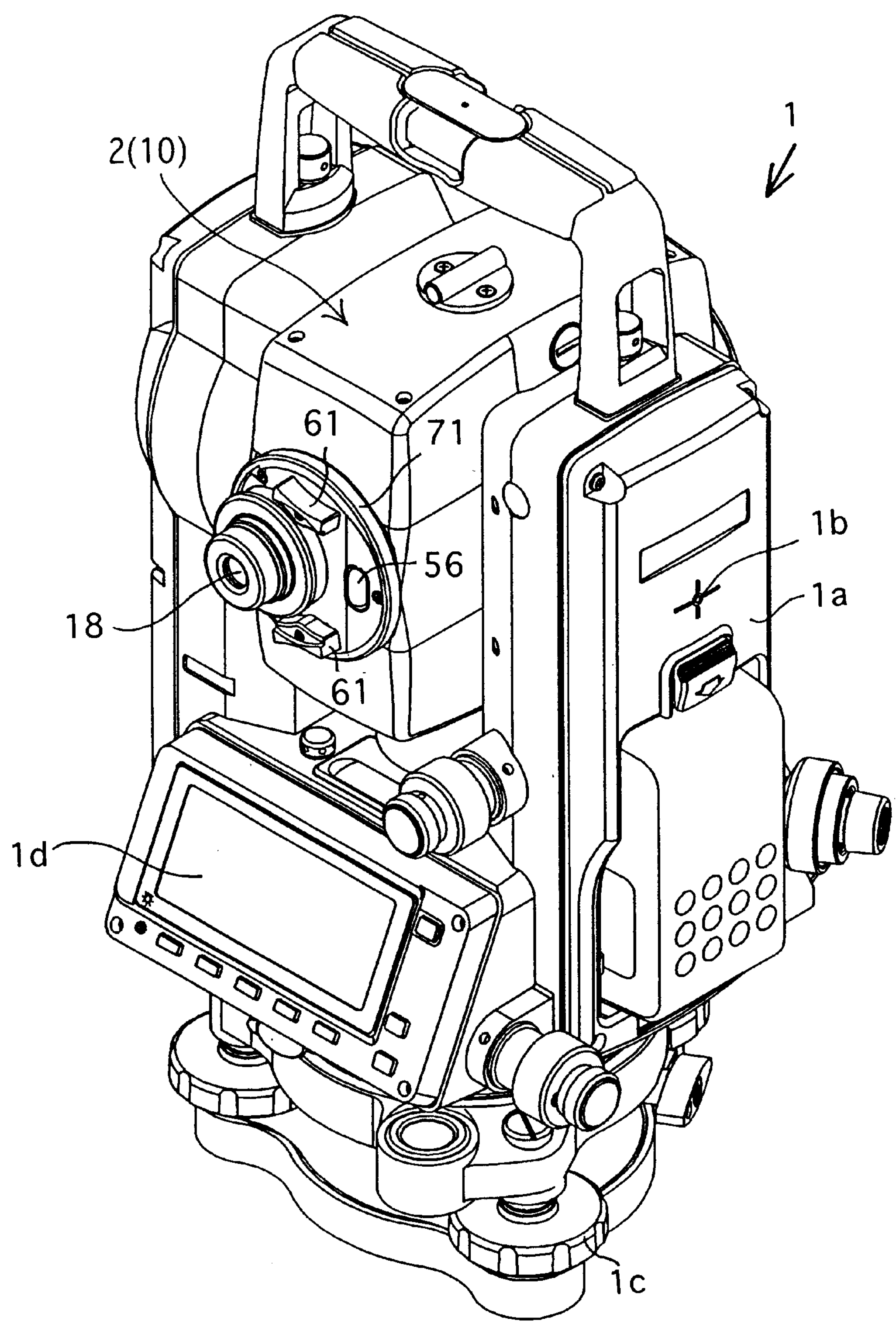
FIG. 16 is a perspective view of a collimation telescope of a total station, viewed from the eyepiece lens side, according to a fourth embodiment of the present invention.

The surveying instrument 1 is provided with a collimation telescope 10 which is attached to the body frame 1*a* so as to rotate about the horizontal axis 1*b*, as shown in FIG. 16. In the fourth embodiment, the outer appearance of the surveying instrument 1 on the objective lens 16 side is the same of the second embodiment shown in FIG. 7, and hence the following explanation will be given with reference to FIG. 7 where appropriate.

The collimation telescope 10 is provided with a multi-focus function, i.e., an AF (Auto-Focus) function, a PF (Power Focus) function, and an MF (Manual Focus) function. The collimation telescope 10 is provided on the external front end with the objective lens 16 and on the external rear end with the eyepiece 18. The body frame 1*a* is provided with elements indispensable to a surveying instrument, such as the leveling screws 1*c* and the operation display 1*d*.

The collimation telescope 10 is movable between the normal measurement position shown in FIG. 16 and the reverse measurement position in which the instrument is rotated and reversed about the horizontal axis 1*b* with respect to the normal measurement position. The total station has distance and angle measuring functions, however, these functions and the structures therefor are not the subject of the present invention, and accordingly no explanation thereof will be given.

Figure 18:
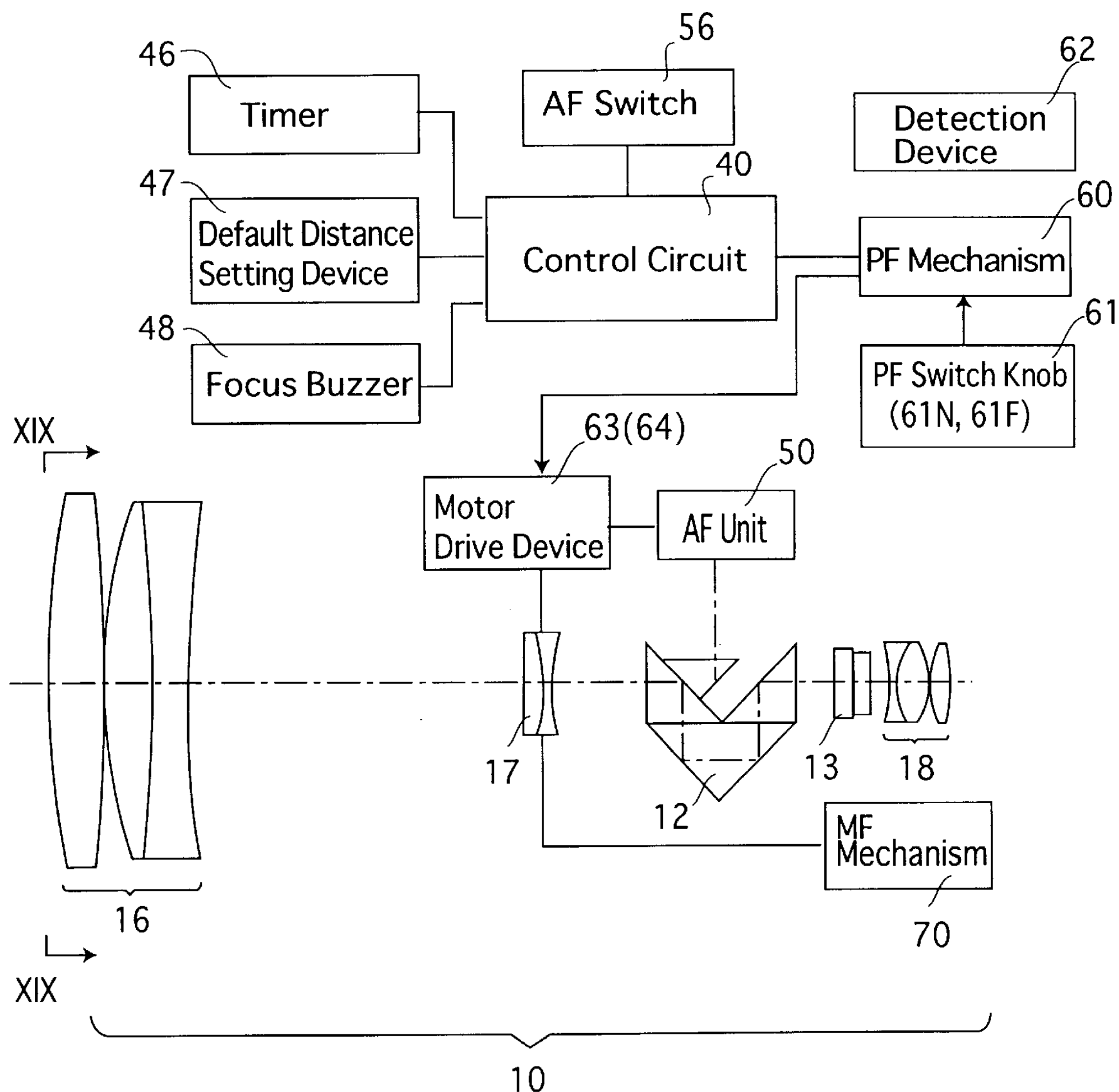
FIG. 18 is a systematic connection diagram of a collimation telescope of a surveying instrument according to a fourth embodiment of the present invention.
Figure 19:
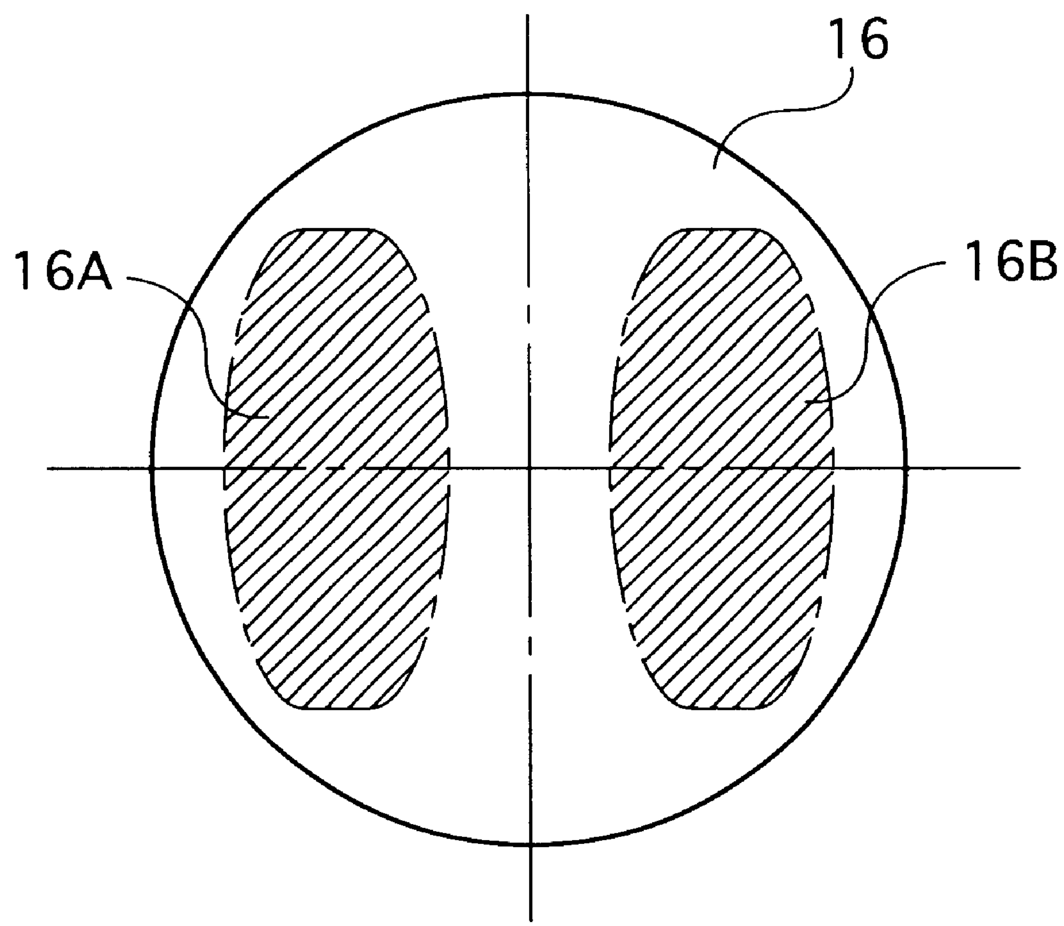
FIG. 19 is a schematic view of a pair of pupil areas on an objective lens of a focus detector, as viewed from the direction of the arrows XIX—XIX in FIG. 18.

FIG. 18 shows an optical system of the collimation telescope 10. Similar to the second embodiment, the collimation telescope 10 includes the objective lens 16, the focusing lens 17, the image erecting optical system (Porro prism) 12, the focusing plate 13, and the eyepiece 18, in this order from the object side. In the fourth embodiment, the focusing plate 13 is provided with a reticle (collimation axis) 15 provided thereon for accurate sighting. The focusing lens 17 is movable in the direction of the optical axis L, so that the in-focus image of the object can be formed on the surface of the focusing plate 13 on the objective lens 16 side by adjusting the axial position of the focusing lens 17 in accordance with the object distance, as in the second embodiment. The operator can view an enlarged object image on the focusing plate 13 through the eyepiece 18.

The Porro prism 12 is provided with a beam splitting surface identical to that in the first embodiment, so that the phase difference type AF detection unit (focus detector) 50 is arranged in the light path of a split beam. The AF detection unit 50 detects the focus state on a focus detection surface which is optically equivalent to the focusing plate 13, i.e., detects the amount of defocus, such as front focus or rear focus, based on the same principle as that in the first embodiment.

In the AF detection unit 50, the focal point is detected, based on a pair of object images formed on the line sensors 54, by the light bundles passing through a pair of separate pupil portions 16A and 16B (FIG. 19) on the objective lens 16. The shape of the pupil portions 16A and 16B can be determined by separator masks 55 located in the vicinity of the separator lenses 53, as in the first embodiment.

The AF function of the surveying instrument in the fourth embodiment has a single focus mode in which only one AF operation is carried out by the control circuit 40, and a continuous focus mode in which the plural AF operations are sequentially carried out by the control circuit 40, as in the first embodiment. The control circuit 40 carries out the AF operation in accordance with a selected focus mode. An AF start switch 56, a timer 46, a default distance setting device 47, and a focus buzzer 48 are connected to the control circuit 40. The single focus mode or the continuous focus mode are selectively set when the AF start switch 44 is depressed either only once or when the AF start switch 44 is depressed twice within a predetermined time, respectively, as in the first embodiment.

In the single focus mode, only one detection of the output of the AF detection unit 50 and only one calculation/control by the control circuit 40 based on the detection of the output of the AF detection unit 50 are carried out. Consequently, the objective lens 17 is moved to the focal position corresponding to the distance of the object 16. When an in-focus state is obtained, the buzzer 48 operates to make a buzzing sound. When the AF operation is completed, the power source of the AF apparatus is turned OFF.

The focusing lens 17 is moved in the forward and rearward axial directions not only by the AF (auto focus) operation, but also by the PF (power focus) mechanism 60 and the MF (manual focus) mechanism 70. The PF mechanism 60 includes an advance switch contact 61N and a retraction switch contact 61F, that are operated by PF switch knobs (levers) 61. The control circuit 40 causes the electric motor 64 provided in the motor drive mechanism 63 to rotate in the forward direction to move the focusing lens 17 forwardly in the optical axis direction when the advance switch contact 61N is ON (focused on a close object). When the retraction switch contact 61F is ON, the motor 64 is reversed by the control circuit 40 to move the focusing lens 17 rearwardly in the optical axis direction L (focused on a distant object). The operation by the PF mechanism 60 is carried out independently of the output of the AF detection unit 50.

Figure 17:
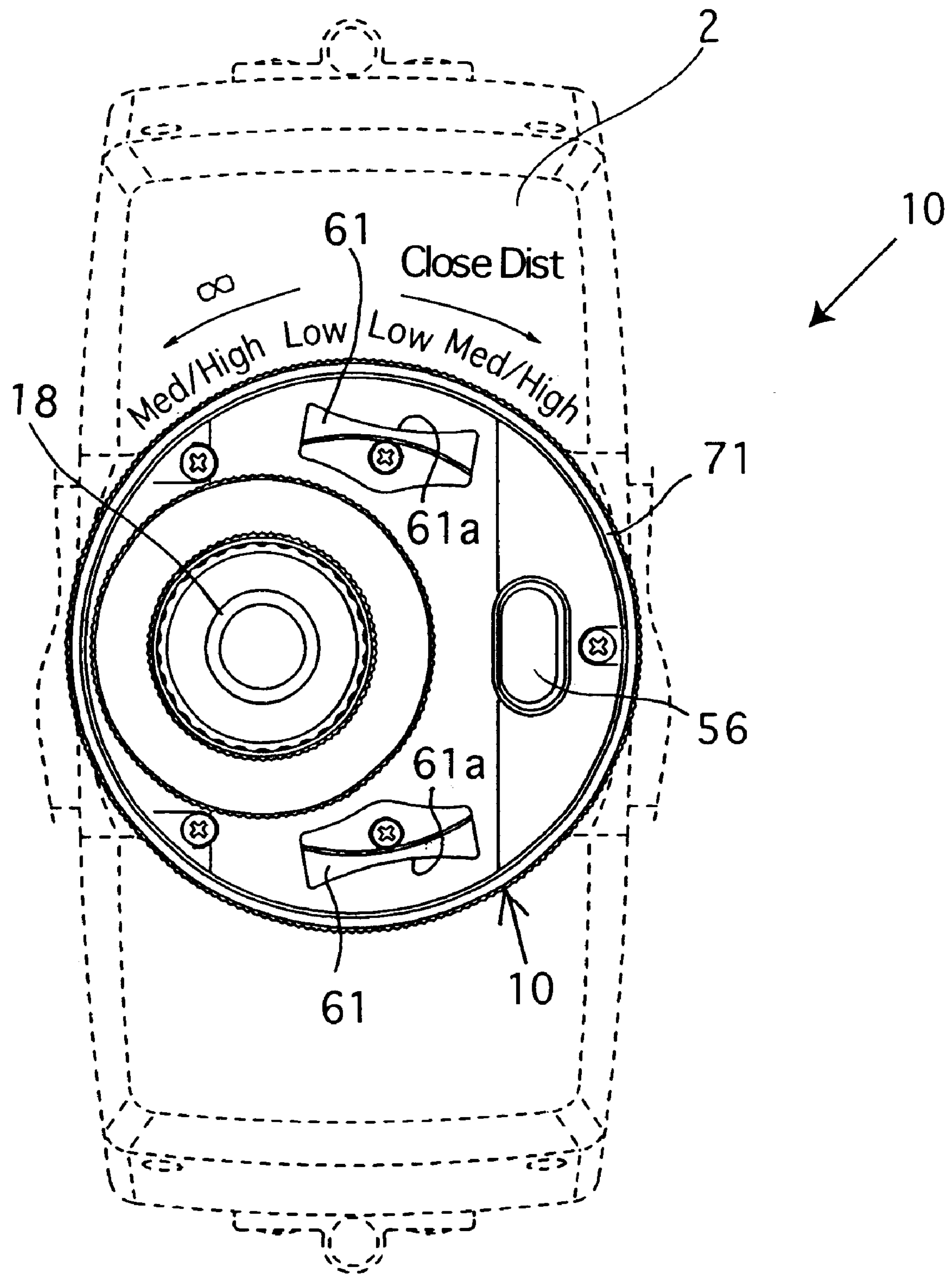
FIG. 17 is a front elevational view of an eyepiece portion of a collimation telescope shown in FIG. 16.

FIG. 17 shows the arrangement of the PF switch knobs 61 by way of example. As mentioned above, the collimation telescope 10 is reversibly rotatable about the horizontal axis 1*b* between the normal measurement position and the reverse measurement position. A pair of PF switch knobs 61 are the same as those in the second embodiment.

The pair of PF switch knobs 61 are set so that the moving speed of the focusing lens 17 increases as the displacement thereof from the neutral position in the forward or rearward direction increases, and after the PF switch knobs reach the extremities of the movement, the moving speed of the focusing lens 17 increases as the stop time at the extremities increases, as in the second embodiment.

Since the eyepiece 18 is deviated from the optical axis of the objective lens 16 duze to the Porro prism 12 being provided in the collimation telescope 10, as shown in FIG. 18, the center of the eyepiece 18 is located eccentrically from the center of the collimation telescope 10 in the horizontal direction as shown in FIG. 17. The AF switch 56 to perform the AF operation mentioned above is provided in a space provided in the side portion of the lens barrel 2 of the collimation telescope due to the eccentric arrangement of the eyepiece 18. In other words, the AF switch 56 is arranged between the pair of PF switch knobs 61, next to the eyepiece 18.

The MF mechanism 70 moves the focusing lens 17 forwardly or rearwardly in the optical axis direction in accordance with the forward or reverse rotation of the focusing ring (manual focus adjusting ring) 71 which is rotatably supported in the vicinity of the end of the collimation telescope 10 on the eyepiece 18 side. The focusing ring 71 is coaxial to the optical axis L of the objective lens 16. The MF mechanism 70 in the fourth embodiment can be the same as, for example, that in the second embodiment shown in FIG. 12.

Figure 20:
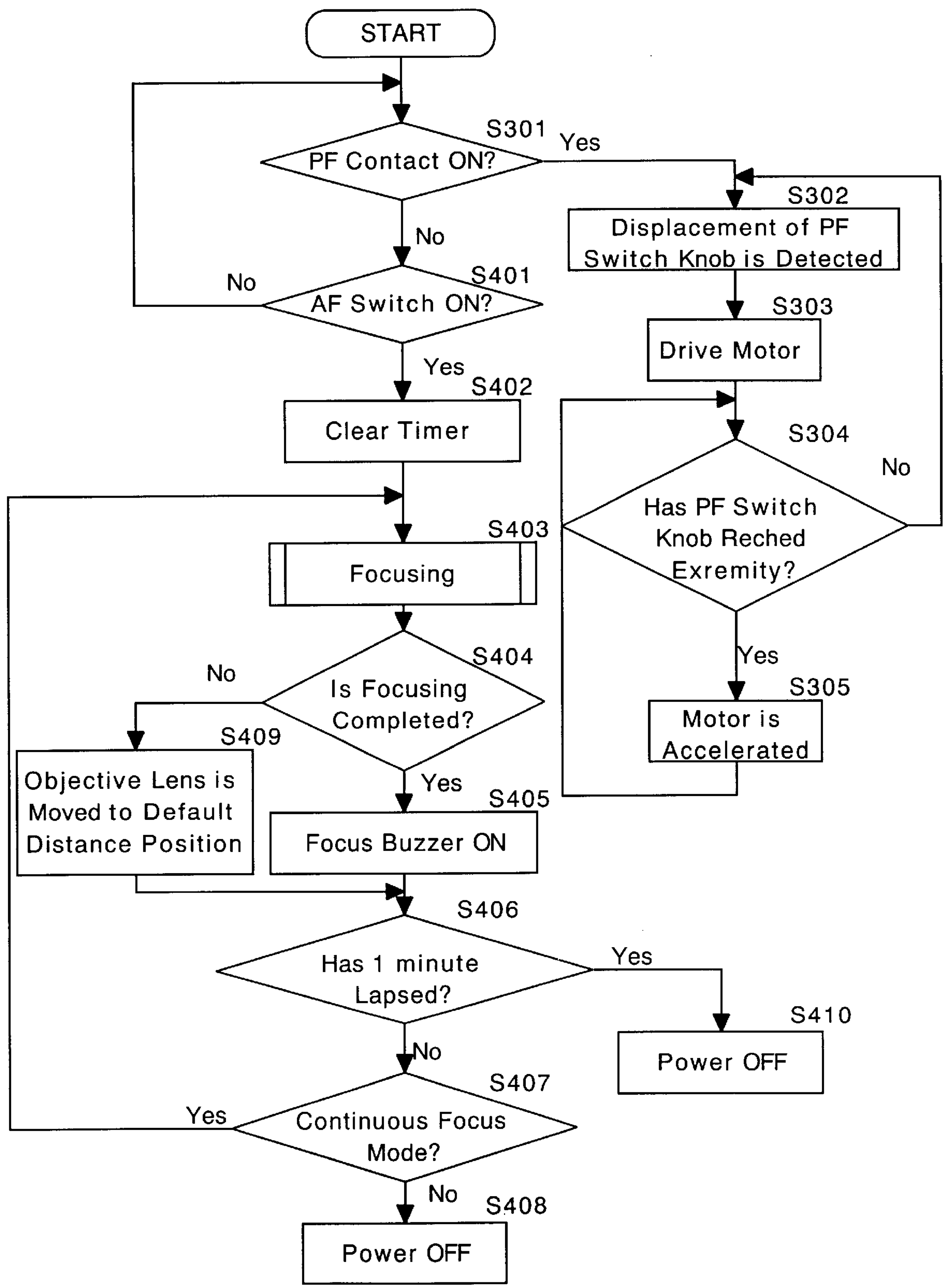
FIG. 20 is a flow chart of the operations of a surveying instrument according to a fourth embodiment of the present invention, by way of example.

FIG. 20 shows a flow chart of the operation of the surveying instrument having the multi-focus function described above, by way of example. The operation in this flow chart is performed by the control circuit 40.

If the PF switch knob 61 is operated, it is checked whether the advance switch contact 61N or the retraction switch contact 61F is turned ON (S301). If the advance switch contact 61N or the retraction switch contact 61F is turned ON (S301; Yes), the operations of the flow chart shown in FIG. 13 are performed. Namely, the displacement of the PF switch knob 61 from the neutral position is detected (S302), so that the motor 41 is driven (S303) in the direction corresponding to the operated switch contact and at the speed of rotation corresponding to the displacement, with reference to data stored in the memory. Thereafter, whether or not the PF switch knob 61 reaches one of the extremities is checked (S304). If the PF switch knob 61 reaches one of the extremities (S304; Yes), the motor 41 is accelerated (S305). If the PF switch knob 61 has not reached one of the extremities (S304; No), the control is returned to S302.

If neither the advance switch contact 61N nor the retraction switch contact 61F is turned ON (S301; No), it is checked whether or not the AF switch 56 is turned ON (S401). If the AF switch 56 is not turned ON (S401; No), control is returned to S301. If the AF switch 56 is turned ON (S401; Yes), the timer 46 is cleared (initialized) (S402), and a focusing operation is performed (S403).

Thereafter, whether or not the focusing is completed is checked (S404). If the focusing is completed (S404; Yes), the focus buzzer 48 is turned ON to make an audible sound (S405). If the in-focus state is not established (S404; No), the focusing lens 23 is moved to a focal position corresponding to the distance set and stored in the default distance setting device 47 (S409).

Thereafter, whether or not 1 minute (predetermined time) has lapsed is checked by the timer 46 (S406). If 1 minute has not lapsed (S406; No), it is checked whether or not the current mode is the continuous focus mode, i.e., whether or not the AF start switch 44 has been depressed twice (S407). If the current mode is the continuous focus mode (S407; Yes), the control is returned to S403 to repeat the operations thereafter. If the current mode is not the continuous focus mode (S407; No), the power source of the AF apparatus is turned OFF (S408). However, if 1 minute has lapsed (S406; Yes), the power source of the AF apparatus is turned OFF (S410).

The focusing operation at step S403 of the flow chart in FIG. 20 is the same as the focusing operation detailed in the flow chart of the first embodiment shown in FIG. 5.

As can be understood from the foregoing, in this embodiment, the surveying instrument has a multi-focus function, i.e., AF, PF and MF functions, which can be carried out without need for a switching operation.

<Fifth Embodiment>

Figure 21:
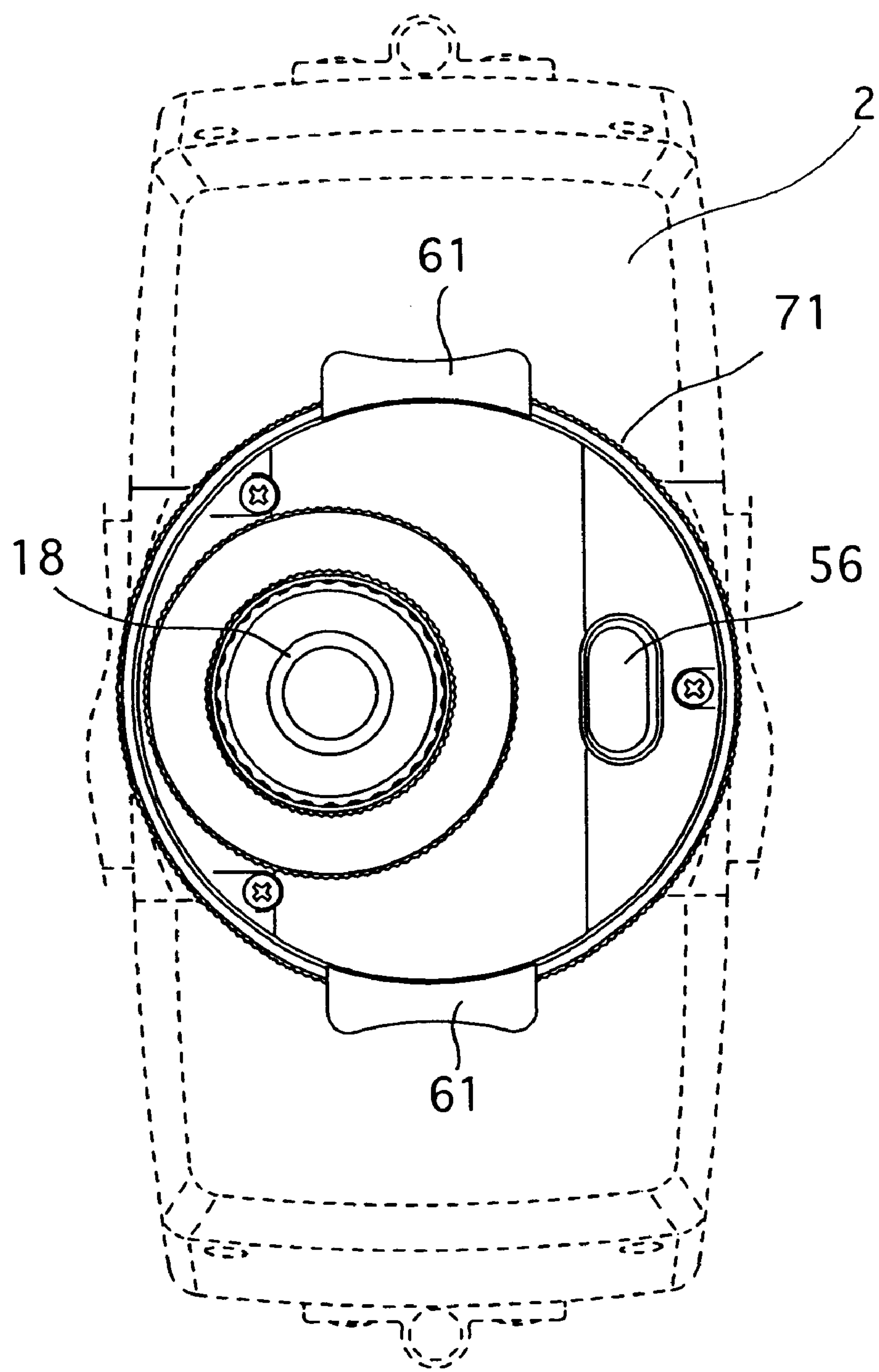
FIG. 21 is a front elevational view of an eyepiece portion in a surveying instrument according to a fifth embodiment of the present invention.

FIG. 21 shows a fifth embodiment of a surveying instrument having a multi-focus function according to the present invention. In this embodiment, a pair of PF switch knobs 61 are provided on the outside of the focusing ring 71 unlike the first embodiment. With this arrangement, it is possible to arrange other members without being restricted by the position of the PF switch knobs 61.

The porro prism 12, which is utilized as an image erecting optical system, and the beam splitting optical system for the AF unit 50 are known in the art, and can be modified in various ways, hence the image erecting optical system and the beam splitting optical system are not limited to those in the first through fifth embodiments.

As can be understood from the above discussion, according to the fourth or fifth embodiment of the present invention, a surveying instrument having a multi-focus function in which the focusing operation is carried out at the various modes can be provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument having an AF apparatus, comprising:

a focus detector that detects a focus state of a focusing lens through a collimation telescope, and that outputs an indication of the focus state; and a controller that moves the focusing lens of the collimation telescope to a focal position, based on the output from the focus detector, said controller moving the focusing lens of the collimation telescope a specific default distance to another focal position when the focus detector outputs an out-of focus state after the controller moves the focusing lens of the collimation telescope to the focal position;

wherein said surveying instrument includes a single focus mode at which only one detection of the output of the focus detector and only one movement of the focusing lens by the controller, based on the detected output, are carried out, and a continuous focus mode at which a plurality of detections of the output of the focus detector and a plurality of movements of the focusing lens by the controller, based on the detected outputs, are sequentially carried out, said detection and said movement, of said single focus mode and said continuous mode, being selectively performed.

2. The surveying instrument having an AF apparatus according to claim 1, wherein the detection and the movement of said single focus mode are performed when an AF switch is turned ON only once, and the plurality of detections and the plurality of movements of said continuous focus mode are performed when the AF switch is turned ON twice within a predetermined period of time.

3. The surveying instrument having an AF apparatus according to claim 1, wherein the detection and the movement of said single focus mode are performed when an AF switch is turned ON only once, and the plurality of detections and the plurality of movements of said continuous focus mode are performed when the AF switch is turned ON continuously for a predetermined period of time.

4. The surveying instrument having an AF apparatus according to claim 1, further comprising a mode selection switch which is adapted to select one of the single focus mode and the continuous focus mode.

5. The surveying instrument having an AF apparatus according to claim 1, further comprising a default distance setting device that sets the default distance.

6. The surveying instrument having an AF apparatus according to claim 1, wherein the continuous focus mode is stopped upon a timer lapsing.

7. The surveying instrument having an AF apparatus according to claim 1, wherein a power source of said AF apparatus is turned ON by the operation of an AF switch.

8. A surveying instrument having a power focus mechanism, comprising:

a motor drive mechanism having an electric motor that drives a focusing lens of a collimation telescope in an optical axis direction; and a power focus mechanism which drives the focusing lens of the collimation telescope one of forwardly and rearwardly in the optical axis direction via the motor drive mechanism; said collimation telescope having a lens barrel that is reversibly rotatable about a horizontal axis between a normal measurement position and a reverse measurement position, and said collimation telescope is provided with a pair of PF switch knobs that are located above and below a horizontal plane passing through an optical axis of an eyepiece, at the normal measurement position and the reverse measurement position of the lens barrel of the collimation telescope.

9. The surveying instrument having a power focus mechanism according to claim 8, wherein the moving speed of the focusing lens increases as the displacement of a switch knob of said pair of PF switch knobs is increased in one of the forward and rearward direction from a neutral position, wherein, when one of said pair of switch knobs is operated so as to reach a movement extremity thereof, the moving speed of the focusing lens increases as the stop time of said switch knob at said movement extremity increases.

10. A surveying instrument having a power focus mechanism, comprising:

a motor drive mechanism having an electric motor that drives a focusing lens of a collimation telescope in an optical axis direction;

a power focus mechanism which drives the focusing lens of the collimation telescope one of forwardly and rearwardly in the optical axis direction via the motor drive mechanism; and an MF mechanism provided on a reversibly rotatable lens barrel of the collimation telescope and comprising a manual adjustment ring, said MF mechanism being configured to manually drive the focusing lens of the collimation telescope in the optical axis direction by the rotation of the manual adjustment ring, wherein said manual adjustment ring is located forward of an eyepiece in the optical axis direction, and wherein said manual adjustment ring is positioned around said eyepiece when viewed on a plane perpendicular to the optical axis from an eyepiece side in the optical axis direction.

11. The surveying instrument having a power focus mechanism according to claim 10, wherein the directions of rotation of the manual adjustment ring to advance and retract the focusing lens correspond to movement directions of a pair of PF switch knobs provided on the collimation telescope to advance and retract the focusing lens, respectively.

12. The surveying instrument having a power focus mechanism according to claim 11, wherein said PF switch knobs are located within the contour of the manual adjustment ring when viewed from the eyepiece side in the optical axis direction thereof.

13. The surveying instrument having a power focus mechanism according to claim 11, wherein said PF switch knobs are located outside of the contour of the manual adjustment ring when viewed from the eyepiece side in the optical axis direction thereof.

14. The surveying instrument having a power focus mechanism according to claim 10, wherein said manual adjustment ring is directly connected to the power focus mechanism which drives the focusing lens.

15. A surveying instrument having a multi-focus apparatus, comprising:

a motor drive mechanism having an electric motor which reciprocally drives a focusing lens of a collimation telescope in the optical axis direction, said collimation telescope having a lens barrel that is reversibly rotatable about a horizontal axis between a normal measurement position and a reverse measurement position, said collimation telescope being provided, on an eyepiece side of said lens barrel, with a pair of PF switch knobs that are located above and below a horizontal plane passing through an optical axis of an eyepiece, at the normal measurement position and the reverse measurement position of the lens barrel of the collimation telescope, respectively;

a focus detector that detects the focus state of the collimation telescope, and that outputs an indication of the focus state;

an AF controller that moves the focusing lens of the collimation telescope to a focal position through the motor drive mechanism, based on the output from the focus detector; and a power focus mechanism which electrically drives the focusing lens of the collimation telescope through the motor drive mechanism in the optical axis direction, independently of the output of the focus detector.

16. The surveying instrument having a multi-focus apparatus according to claim 15, wherein the pair of PF switch knobs are each provided with a finger engagement concave portion that is curved inward toward the center of the lens barrel of the collimation telescope, so that one of a forward and reverse movement of the finger engagement concave portion from a neutral position gives an operation signal to the motor drive mechanism to move the focusing lens in a corresponding one of a forward and rearward direction.

17. The surveying instrument having a multi-focus apparatus according to claim 15, wherein the moving speed of the focusing lens increases as the displacement of a switch knob of said pair of PF switch knobs is increased in one of a forward and rearward direction from a neutral position, wherein, when said switch knob is operated so as to reach a movement extremity thereof, the moving speed of the focusing lens increases the stop time of said switch knob at said movement extremity increases.

18. The surveying instrument having a multi-focus apparatus according to claim 15, wherein said lens barrel is provided on the eyepiece side thereof with an AF switch, between the pair of PF switch knobs, wherein said AF switch is used to operate said AF controller.

19. The surveying instrument having a multi-focus apparatus according to claim 18, wherein the center of the eyepiece is deviated in the horizontal direction from the center of the collimation telescope, said AF switch being located on said lens barrel next to the eyepiece.

20. The surveying instrument having a multi-focus apparatus according to claim 15, further comprising an MF mechanism for manually moving the focusing lens of the collimation telescope in the optical axis direction.

21. A surveying instrument having a multi-focus apparatus, comprising:

a motor drive mechanism having an electric motor which reciprocally drives a focusing lens of a collimation telescope in the optical axis direction, said collimation telescope having a reversibly rotatable lens barrel;

a focus detector that detects the focus state of the collimation telescope;

an AF controller that moves the focusing lens of the collimation telescope to a focal position through the motor drive mechanism, based on the focus state detected by the focus detector; and a power focus mechanism which electrically drives the focusing lens of the collimation telescope through the motor drive mechanism in the optical axis direction, independently of an output of the focus detector;

an MF mechanism which is provided, on the lens barrel, with a manual adjustment ring, said manual adjustment ring being positioned around an eyepiece provided on the lens barrel, when viewed, on a plane perpendicular to the optical axis, from the eyepiece side in the optical axis direction, and said manual adjustment ring being located forward of said eyepiece in an optical axis direction, wherein the focusing lens can be moved in the optical axis direction by the rotation of the manual adjustment ring.

22. The surveying instrument having a multi-focus apparatus according to claim 21, wherein the directions of rotation of the manual adjustment ring to advance and retract the focusing lens correspond to movement directions of a pair of PF switch knobs to advance and retract the focusing lens, respectively.

23. The surveying instrument having a multi-focus apparatus according to claim 22, wherein said PF switch knobs are located within the contour of the manual adjustment ring when viewed from the eyepiece side in the optical axis direction thereof.

24. The surveying instrument having a multi-focus apparatus according to claim 22, wherein said PF switch knobs are located outside of the contour of the manual adjustment ring when viewed from the eyepiece side in the optical axis direction thereof.

25. The surveying instrument having a multi-focus apparatus according to claim 21, wherein said manual adjustment ring is directly connected to said power focus mechanism.

26. The surveying instrument having a multi-focus apparatus according to claim 21, further comprising an MF mechanism for manually moving the focusing lens of the collimation telescope in the optical axis direction.

* * * * *